United States Patent
Abbasi et al.

(10) Patent No.: US 9,448,301 B2
(45) Date of Patent: Sep. 20, 2016

(54) CALIBRATED RADAR APPARATUS AND ASSOCIATED METHODS

(71) Applicants: Aamir A Abbasi, Mundelein, IL (US);
James C Graves, Jr., Roselle, IL (US);
Debra A Jones, Schaumburg, IL (US);
Michael E Lazar, Elgin, IL (US);
Ramanujapuram A Raghuvir, Oak Brook, IL (US)

(72) Inventors: Aamir A Abbasi, Mundelein, IL (US);
James C Graves, Jr., Roselle, IL (US);
Debra A Jones, Schaumburg, IL (US);
Michael E Lazar, Elgin, IL (US);
Ramanujapuram A Raghuvir, Oak Brook, IL (US)

(73) Assignee: DELTA MOBILE SYSTEMS, INC., Elgin, IL (US)

(*) Notice: Subject to any disclaimer, the term of this patent is extended or adjusted under 35 U.S.C. 154(b) by 319 days.

(21) Appl. No.: 14/137,781

(22) Filed: Dec. 20, 2013

(65) Prior Publication Data

US 2015/0177371 A1 Jun. 25, 2015

(51) Int. Cl.
*G01S 13/02* (2006.01)
*G01S 7/35* (2006.01)
*G01S 13/34* (2006.01)
*G01S 13/88* (2006.01)
*G01S 13/93* (2006.01)
(Continued)

(52) U.S. Cl.
CPC .............. *G01S 7/354* (2013.01); *G01S 7/4008* (2013.01); *G01S 7/4021* (2013.01); *G01S 13/343* (2013.01); *G01S 13/88* (2013.01); *G01S 13/931* (2013.01); *G01S 7/41* (2013.01);
*G01S 13/56* (2013.01); *G01S 2007/356* (2013.01); *G01S 2007/4013* (2013.01)

(58) Field of Classification Search
CPC .......... G01S 7/35; G01S 7/4004; G01S 7/411
USPC ................................................ 342/124, 128
See application file for complete search history.

(56) References Cited

U.S. PATENT DOCUMENTS

| 3,950,750 | A | 4/1976 | Churchill et al. |
| 4,003,054 | A | 1/1977 | Goldstone |

(Continued)

FOREIGN PATENT DOCUMENTS

| EP | 0953155 A1 | 11/1999 |
| EP | 2439552 A1 | 4/2012 |

OTHER PUBLICATIONS

Infineon User's Guide to BGT24MTR11 24 GHz Radar, Application Note AN305, Revision1.0, pp. 1/15 to 15/15, Nov. 15, 2012.

*Primary Examiner* — Timothy A Brainard
(74) *Attorney, Agent, or Firm* — Patents and Licensing LLC; Daniel W. Juffernbruch

(57) ABSTRACT

A radar apparatus measures at least one characteristic of at least one object even in a near field. A sweep generator generates a sweep signal to modulate an oscillator to generate a varying frequency signal. A transmitter transmits the varying frequency signal as a radar signal. A receiver receives a reflected radar signal to produce a received signal using the varying frequency signal. A compensation signal memory holds a previously stored compensation signal. A compensation circuit compensates the received signal based on the previously stored compensation signal to produce a compensated received signal. A frequency transformation circuit transforms the compensated received signal to produce a frequency spectrum signal. A peak detector measures the characteristic of the object based on a peak of the frequency spectrum signal. When operating in a calibration mode and the reflected radar signal is quieted, the received signal is written into the compensation signal memory.

19 Claims, 15 Drawing Sheets

(51) Int. Cl.
   *G01S 7/40*     (2006.01)
   *G01S 7/41*     (2006.01)
   *G01S 13/56*    (2006.01)

(56) References Cited

U.S. PATENT DOCUMENTS

| | | |
|---|---|---|
| 4,484,194 A | 11/1984 | Arvidsson |
| 4,488,155 A | 12/1984 | Wu |
| 4,539,565 A | 9/1985 | Norsworthy |
| 5,105,195 A | 4/1992 | Conrad |
| 5,270,720 A | 12/1993 | Stove |
| 6,384,770 B1 | 5/2002 | De Gouy et al. |
| 6,703,969 B2 | 3/2004 | Winter et al. |
| 6,816,107 B2 | 11/2004 | Pleva et al. |
| 6,864,831 B2 | 3/2005 | Woodington et al. |
| 7,068,216 B2 | 6/2006 | Kliewer et al. |
| 7,202,812 B2 | 4/2007 | Krikorian et al. |
| 7,705,773 B2 | 4/2010 | Vacanti |
| 8,274,427 B2 | 9/2012 | Minami |
| 2008/0252513 A1* | 10/2008 | Inoue .............. G01S 7/4004 342/175 |
| 2011/0222631 A1 | 9/2011 | Jong |

* cited by examiner

SWEEP SIGNAL 310

VARYING FREQUENCY SIGNAL 330

RECEIVED
SIGNAL
210

PREVIOUSLY
STORED
COMPENSATION
SIGNAL
165

CALIBRATED RADAR APPARATUS AND ASSOCIATED METHODS

BACKGROUND OF THE INVENTIONS

1. Technical Field

The present inventions relate to radar systems which measure characteristics of detected objects and, more particularly, relate to calibrated radar systems useful for at least applications which measure characteristics of detected objects in the near field of the radar system.

2. Description of the Related Art

Radar systems have been used for distance ranging and speed determination. Frequency Modulated Continuous Wave (FMCW) is one common form of radar signaling. Accuracy of determinations of speed or distance ranging has been improved using calibration.

One traditional way for detection of targets with a radar system is to transmit a carrier signal of a known strength and frequency, which then reflects off the target of interest, and then the signal is received by the radar unit. This received signal is then mixed with the transmitted signal, and any frequency difference between the two signals (the "mixing product") results in what is known as a "beat note", which is a low-frequency signal (often less than 1000 Hz) which represents the instantaneous difference of the frequencies being transmitted and received. The farther away the target, the greater the frequency difference, which results in a higher frequency beat note. This signaling method used for these systems is called: frequency modulated continuous wave (FMCW).

For typical open-air applications (such as vehicle collision avoidance, presence detection for security or lighting control, and automatic door opening), the FCC limits the range of frequencies allowed. For example, in the 24 GHz band, the limits are 100 MHz or 250 MHz depending on the application. This band limit, in turn, limits how high in frequency a beat note can be effectively generated for a target at a given range.

In traditional FMCW radar systems, the detection and measurement of targets is done by analyzing the beat note with a Fast Fourier Transform (FFT), which provides a means of directly measuring frequency of the beat note. This worked well when there was an entire cycle of the beat note inside the time window of interest.

For typical applications of radar (vehicle collision avoidance; tank level monitoring for large, open, non-metallic tanks; presence detection for security or lighting control; automatic door opening) operating in the above restricted frequency bands, the beat note is still sufficiently high enough in frequency for targets beyond about the 2 meter range. Therefore with the traditional FFT technique, it is possible to reliably detect targets beyond about the 2 meter range.

Other use cases require detection and distance measurements of targets within the near field (less than about 2 meters) of the radar sensing system. These use cases include tank level monitoring for small, open air tanks; collision avoidance for objects within inches of each other; location of in-wall objects (pipes, conduit, studs), gesture detection; and others.

Near field determinations of distance ranging and speed determination have been attempted and suffer from inaccuracies the shorter the near field. What is needed is improved accuracy in radar systems especially in near field applications.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

For near field targets, because the beat note frequency is low enough to be masked by other factors, distance measurement techniques for traditional radar sensing systems using Frequency Modulated Continuous Wave (FMCW) are inaccurate.

One of the main factors confounding the detection of near-field objects is the frequency modulation of the carrier signal. This modulation introduces its own signal at a frequency similar to that of the beat note, making it difficult to distinguish the actual beat note with the traditional Fast Fourier Transform (FFT) algorithm. Another confounding factor is leakage and other artifacts generated by the radar unit itself.

The accuracy of distance measurements are traditionally improved by sweeping a wide bandwidth of the operating frequency of the radar sensing system, e.g. 600 MHz to 1 GHz bandwidth. This method can be utilized by enclosed environments but cannot be used for open air systems due to the above mentioned regulatory restrictions.

Therefore, a need exists for near field object detection and corresponding distance measurement for open air environment use cases. The challenges of near field object detection using FMCW can be overcome by the signal processing methods and corresponding calibration technique as described.

Although it was understood that the beat note could not extend beyond specific range, the present inventions have gone beyond the accepted limits and have achieved better results especially at a certain frequency relationship.

It has been discovered that accuracy of measurements of characteristics of objects measured by a radar system can be improved, by calibration that eliminates the ambient artifacts, especially in near field applications. It has been recognized that these so called ambient artifacts particularly affect the closest in near field measurements. This is particularly a problem when using a Fast Fourier Transform (FFT) prior to peak detection for signal analysis to measure the characteristics of an object. It has been identified that these so called ambient artifacts created errant peaks at low frequencies. If these low frequency peaks are merely ignored, then very near field measurements become impossible. Applicants propose approaches for eliminating these errant low frequency peaks and thereby achieving better accuracy in radar measurements systems, especially as the field distance shortens.

Figure 1:
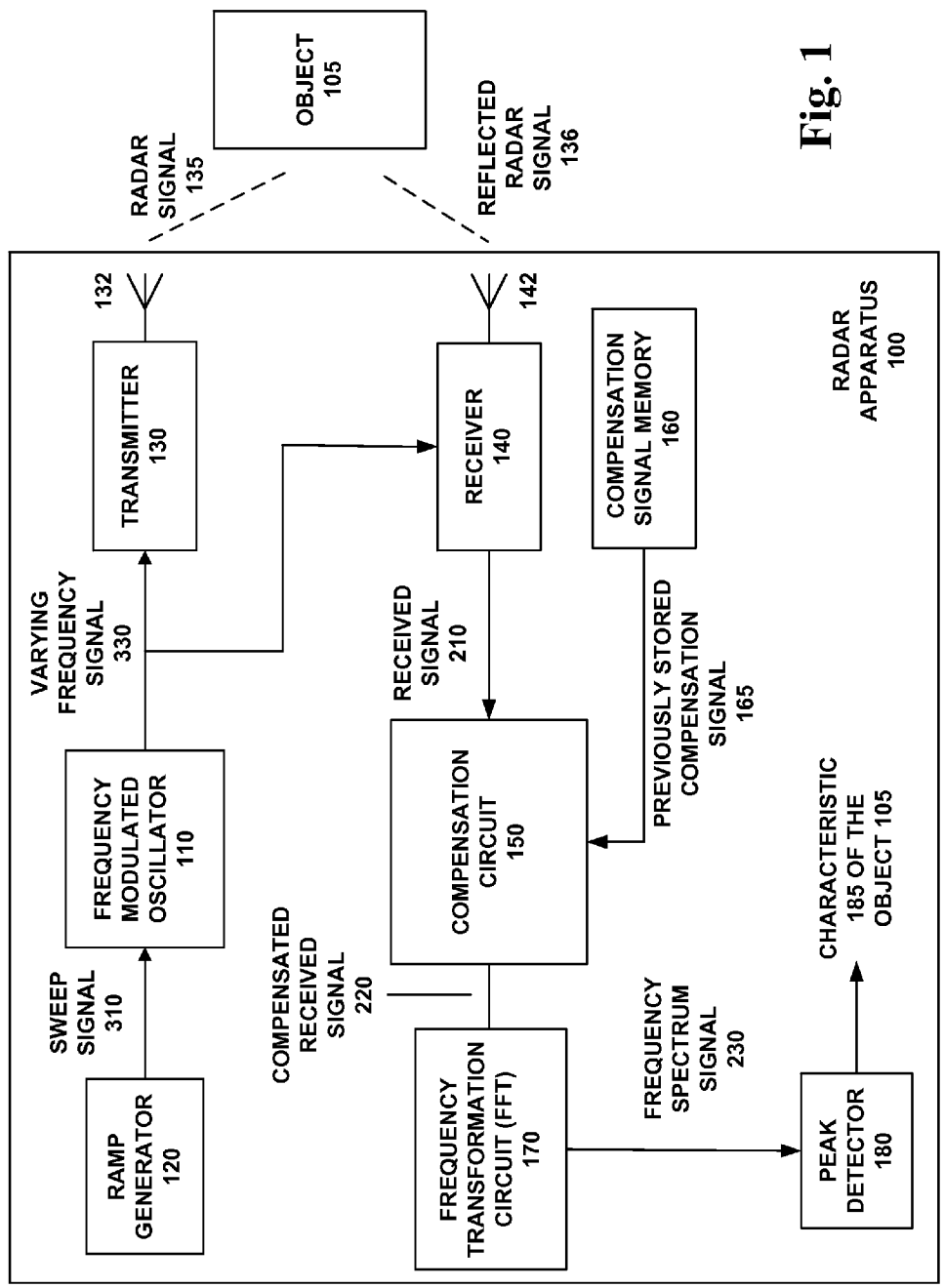
FIG. 1 illustrates a schematic block diagram of a radar apparatus according to embodiments of the present inventions.

FIG. 1 illustrates a schematic block diagram of a radar apparatus according to embodiments of the present inventions. The radar apparatus 100 measures characteristics of at least one object 105. A distance to the object 105 is one example characteristic to be measured though the characteristics measured can include any of presence, distance, speed, acceleration, direction of motion, size, and reflectivity alone or in combination. A frequency modulated oscillator 110 generates a varying frequency signal 330 based on a sweep signal in the embodiment illustrated in FIG. 1. A ramp generator 120 is coupled to the frequency modulated oscillator 110 and generates a sweep signal 310. The frequency modulated oscillator 110 is modulated by the sweep signal 310 to generate a varying frequency signal 330. A transmitter 130 is coupled to the frequency modulated oscillator 110 to generate a radar signal 135 using the varying frequency signal 330. A transmit antenna 132 is coupled to the transmitter 130.

In one preferred embodiment according to that illustrated in FIG. 1, the radar apparatus 100 is a Frequency Modulated Continuous Wave (FMCW) radar apparatus. To achieve FMCW, the ramp generator 120 generates a sweep signal 310 of a ramp shape that periodically repeats over time in a predetermined ramp pattern. Then the frequency modulated oscillator 110 and the transmitter 130 generate the varying frequency signal 330 and radar signal 135 over time based on the sweep signal 310. In the illustrated embodiment of FIG. 1 the sweep signal 310 is preferably a sawtooth waveform. Alternately, besides a sawtooth waveform, the waveform of the sweep signal 310 can take different forms such as a triangular waveform and asymmetrical variants thereof.

A receiver 140 receives a reflected radar signal 136 reflected off of an object 105 via a receive antenna 142. The transmit antenna 132 and the receive antenna 142 can be patch antennas of 8-elements or other numbers of elements, e.g. 2, 4, 16, or other antenna types such as horn or array.

The receiver 140 is coupled to a receive antenna 142. The receiver 140 is coupled to the same frequency modulated oscillator 110 to obtain the reflected radar signal 136 using the same varying frequency signal 330. The output of the receiver 140 produces a received signal 210.

A compensation circuit 150 is coupled to the receiver 140 to compensate the received signal 210 based on a previously stored compensation signal 165 in a memory 160 to produce a compensated received signal 220. The compensation circuit 150 preferably subtracts the previously stored compensation signal 165 from the received signal 210.

The previously stored compensation signal 165 is a previously measured received signal in the absence of a reflected radar signal 136. The previously stored compensation signal 165 is a time domain signal in the preferred embodiment. The previously stored compensation signal 165 is measured previously and representative of at least the varying frequency signal based on the sweep signal. The previously stored compensation signal 165 is substantially composed of undesired signals including leakage artifacts involving one or more of the ramp generator 120 including the sweep signal 310, the oscillator 110, the transmitter 130, the receiver 140, and signal couplings therebetween. Ideally the previously stored compensation signal 165 would be entirely composed of just the undesired signals including leakage artifacts, but a faint radar signal 135 may still be there because perfect absorption or quieting is nearly impossible.

The calibration mode is conducted in a quiet room environment or other quiet environment when all radar signals were absorbed in order to measure and determine the previously stored compensation signal 165. The previously stored compensation signal 165 is unique to a particular hardware and its prior measured characteristics due to hardware component variations and/or other factors. Nevertheless, in alternative implementations, depending on the consistency of different hardware and required performance, a same previously stored compensation signal 165 can be used across multiple hardware units.

The previously stored compensation signal 165 in alternative constructions can be dependent upon various parameter values of the radar apparatus including receive gain, frequency, transmit power, sampling rate, bandwidth, and ramp time. One option is to control different parts or all parts of the radar apparatus under various parameter conditions to store different calibration measurements and later read them for compensation based on the operation conditions. Therefore, in the preferred embodiment, multiple compensation signals are measured and stored based on multiple sets of the various parameter values while operating in calibration mode. The previously stored compensation signal 165 in alternative constructions can use a lookup table with possibly multiple dimensions based on the multiple sets of the various parameter values while operating in the calibration mode. The previously stored compensation signal 165 used by the compensation circuit 150 can be chosen from a plurality of previously stored compensation signals, each of the plurality of previously stored compensation signals corresponding to various parameters including receive gain, frequency, transmit power, sampling rate, bandwidth, and ramp time.

A frequency transformation circuit 170 is coupled to the compensation circuit 150 to receive the compensated received signal 220 and produce a frequency spectrum signal 230. In the one embodiment of FIG. 1, a Fast Fourier Transform (FFT) is performed on the compensated received signal 220 in the frequency transformation circuit 170. The frequency transformation circuit 170 transforms the compensated received signal into a frequency domain to produce the frequency spectrum signal 230 which is representative of the compensated received signal.

Measurement of a distance characteristic for radar operating in FMCW mode can be defined by Equation 1. The relationship between distance to the object and various system parameters is as follows:

$$R = \frac{c * Tr * Fb}{2 * BW} \qquad \text{Equation 1}$$

where:
R=measurable distance characteristic 185 of the object 105
c=constant velocity of light
Tr=time for one ramp (up chirp or down chirp) of the sweep signal 310
Fb=difference in frequency of the radar signal 135 transmitted and the reflected radar signal 136 (beat frequency, a.k.a., frequency of a peak in the frequency spectrum signal 230)
BW=sweep bandwidth of the varying frequency signal 330

As stated in Equation 1, distance (R) to the object 105 is a function of ramp time (Tr) of the sweep signal 310 to the difference in frequency (Fb) of the radar signal 135 and the reflected radar signal 136 and the sweep bandwidth (BW) of the varying frequency signal 330. A beat frequency or frequency of a peak in the frequency spectrum signal 230 is the difference in frequency (Fb) of the radar signal 135 and the reflected radar signal 136. Furthermore, the resolution of distance to the object directly depends on the measured accuracy of the difference frequency (Fb) of the radar signal 135 and the reflected radar signal 136, also known as the beat frequency. When a measured object is not fixed and moves some, the beat frequency (Fb) moves as the object moves.

Also note time and frequency have a reciprocal relationship defined by Equation 2 as follows:

$$Tr = \frac{1}{Fr} \qquad \text{Equation 2}$$

where Fr is the corresponding ramp (chirp) frequency of the sweep signal 310.

In a special case where the difference in frequency of the radar signal 135 and the reflected radar signal 136 (Fb) approaches the value of the ramp frequency (Fr), the terms Fb and Fr can be mathematically assumed to be equal and cancel, so Equation 1 can be simplified to an approximation as Equation 3. In this special case, Equation 1 reduces to Equation 3 as follows:

$$R = \frac{c}{2 * BW} \qquad \text{Equation 3}$$

where R is an ambiguous distance to the object 105. At the ambiguous distance of this special case, measurement of the distance was nearly impossible prior to the calibration and compensation methods and apparatuses of embodiments disclosed herein.

Thus the radar apparatus 100 is capable of measuring characteristics to the at least one object using an frequency relationship when a frequency difference between the radar signal 135 and the reflected radar signal 136 is near a frequency of the sweep signal 310. This frequency relationship exists for distance and other characteristics such as velocity. Measurements of characteristics taken near this frequency relationship could not previously be resolved or were inaccurate.

The relation of Equation 3 simply states that an ambiguous distance (R) to the object 105 is inversely related to the sweep bandwidth (BW) of the radar signal 135. When measuring a characteristic other than the example of distance, such as velocity, an ambiguous point can be recognized by a velocity equation different than Equation 3, but one where the ramp frequency (Fr) becomes equal to the difference in frequency of the radar signal 135 and the reflected radar signal 136 (Fb). Prior to the calibration and compensation methods and apparatuses of embodiments disclosed herein, radar was incapable of measuring characteristics of objects when the ramp frequency (Fr) was near the difference in frequency of the radar signal 135 and the reflected radar signal 136 (Fb). When the ramp frequency (Fr) was near the difference in frequency of the radar signal 135 and the reflected radar signal 136 (Fb), the frequency spectrum domain peaks were too close together to resolve. Thus, the radar apparatus 100 measures characteristics of objects even when the ramp frequency (Fr) is near the difference in frequency of the radar signal 135 and the reflected radar signal 136 (Fb).

Noteworthy is also the fact that there are physical as well as regulatory limits on the bandwidth BW term. This also highlights the fact that when Fr=Fb in the time domain, one cycle of the difference frequency fits exactly during one ramp or chirp. Furthermore, other variations of this case exist when the beat frequency (Fb) is closer to Fr in such a way that the beat frequency (Fb) may be slightly lower than the ramp frequency (Fr).

Accurate determination of a measurable distance characteristic is further compromised by the leakage of the radar signal within the radar circuitry that presents the leakage responses together with the desired beat frequency (Fb). To accurately measure beat frequency (Fb), normal frequency transformation methods such as FFT become exceedingly difficult to resolve these small frequency differences. The peaks in the FFT frequency plot become either so close together or so broad that a peak detector is unable to uniquely identify the peak due to the beat frequency (Fb). This range of operation when the desired beat frequency (Fb) is lower than the ramp frequency (Fr) can be defined as the near field.

Figure 2:
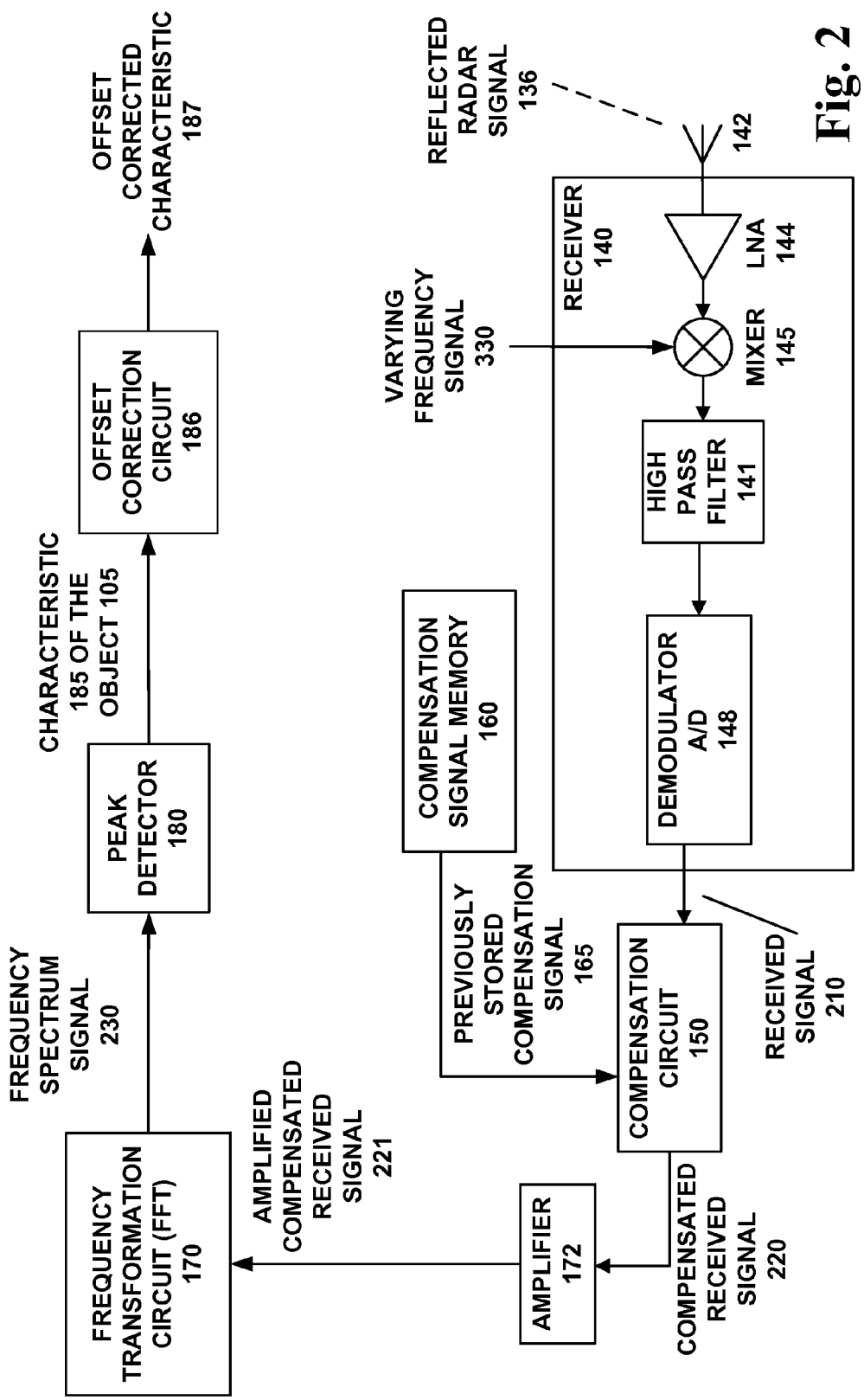
FIG. 2 illustrates a schematic block diagram of a receive path according to an exemplary embodiment of the present inventions.

FIG. 2 illustrates a schematic block diagram of one preferred embodiment of a receive path including a receiver 140. The low noise amplifier (LNA) 144 is coupled to the receiver antenna 142 and amplifies the reflected radar signal 136 received at the receiver antenna. The receiver 140 uses a mixer 145 to mix the amplified reflected radar signal with the varying frequency signal 330 in the one preferred embodiment according to that illustrated in FIG. 2. The receiver 140 can use a demodulator or analog to digital converter 148 at its output or the demodulator or analog to digital converter 148 can be implemented separate from the receiver. Additionally filtering can occur in the receiver 140 associated with the demodulator or analog to digital converter 148. A high pass filter 141 as illustrated helps remove the leakage artifacts. The output of the receiver 140 and the subsequent demodulator or analog to digital converter produces a received signal 210.

In the one embodiment of FIG. 2, an amplifier 172 is coupled between the compensation circuit 150 and the frequency transformation circuit 170 to amplify the compensated received signal 220 to improve signal to noise ratio and consequently peak detection by the peak detector 180.

A peak detector 180 is coupled to the frequency transformation circuit 170 and determines a signal or peak representative of a characteristic 185 of the object 105 which the reflected radar signal 136 was reflected based on at least one peak of the frequency spectrum signal 230. The peak detector 180 can recognize either one maximum peak or multiple peaks and not necessarily a maximum peak. The peak detector 180 can recognize multiple characteristics of an object 105 or a characteristic of multiple objects depending on how many peaks the detection is designed to detect. Examples of characteristics measured by the radar apparatus include a distance to the object 105 as well as any of presence, speed, acceleration, direction of motion, size, and reflectivity alone or in combination. One or more peak detections indicate these characteristics. Additionally, the peaks at an up or down chirp of the sweep signal will provide more information for indicating these characteristics. When the compensation signal memory 160 stores different values for up and down chirp compensation parameters, accuracy is improved.

An offset correction circuit 186 is coupled to the peak detector 180 to apply a singular dimension offset to the signal representative of the characteristic 185 to produce a signal representative of an offset corrected characteristic 187. The singular dimension offset applied in one embodiment can be a distance. In other embodiments it can be other values such as presence, speed, acceleration, direction of motion, size, and reflectivity or combinations. The offset correction is also not always needed and may be zero or not implemented depending on the application or environment of the radar apparatus.

Figure 3:
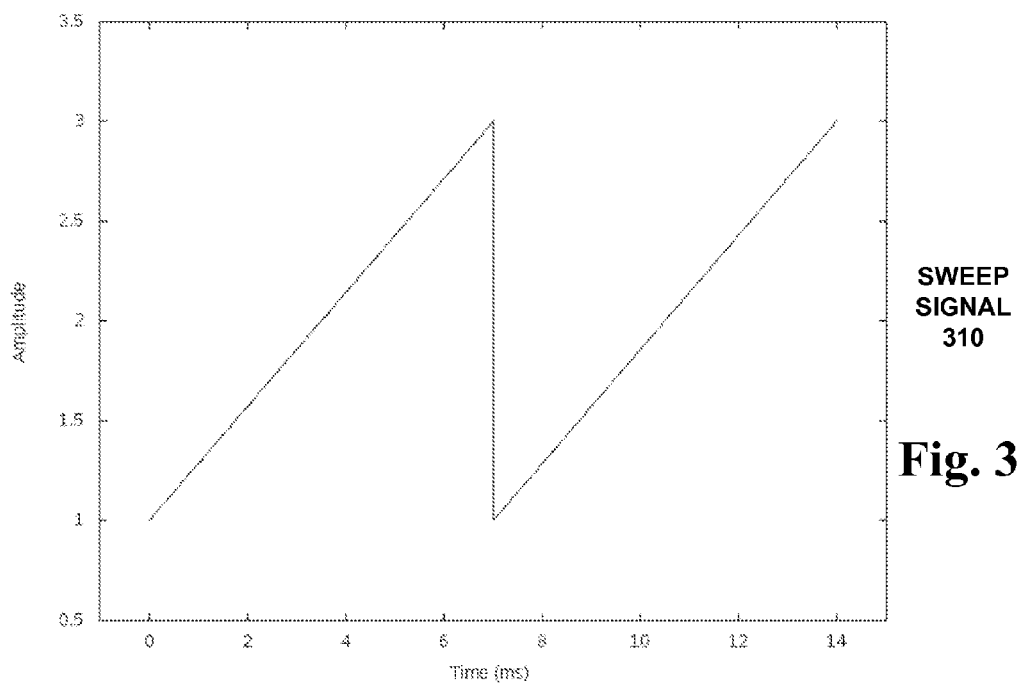
FIG. 3 illustrates a plot of a sweep signal according to an exemplary embodiment of the present inventions.

FIG. 3 illustrates a sweep signal 310 in an exemplary embodiment of the present inventions. The sweep signal 310 varies in amplitude over time and is of a ramp shape that periodically repeats over time in a predetermined ramp pattern, according to the preferred embodiment. The horizontal axis is in units of time in milliseconds (ms). The vertical axis is the amplitude of the sweep signal. The example plot in FIG. 3 is for illustrative purposes. The range of frequencies, the time period, and the pattern of the sweep signal 310 may vary depending upon the requirements of an embodiment of the radar apparatus 100.

Figure 4:
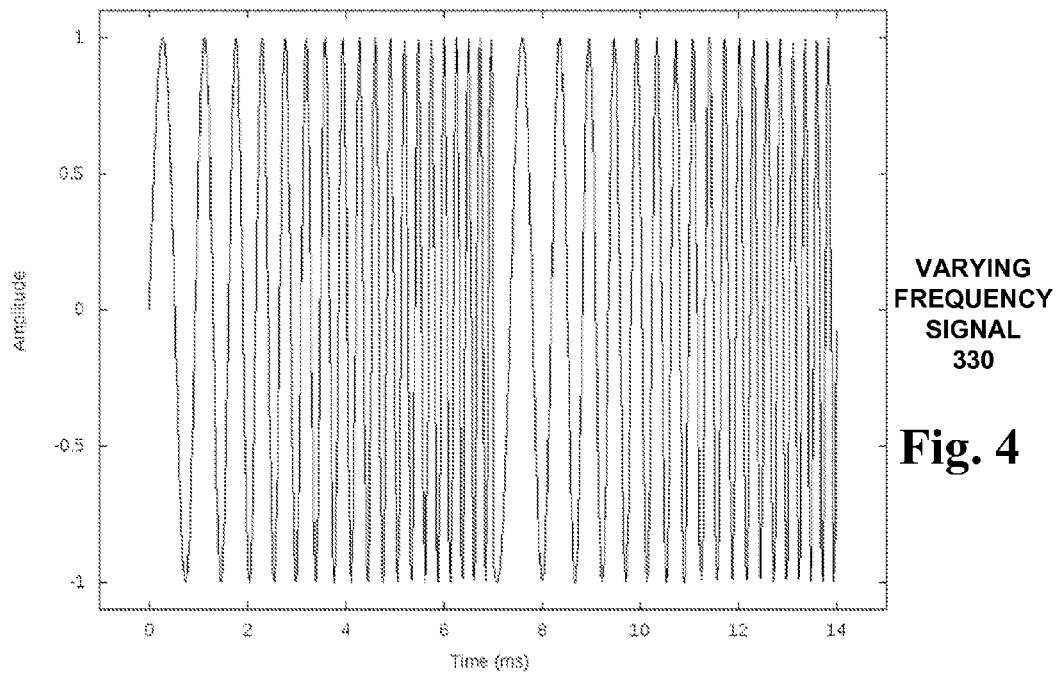
FIG. 4 illustrates a plot of a varying frequency signal according to an exemplary embodiment of the present inventions.

FIG. 4 illustrates a varying frequency signal 330. The varying frequency sweep signal is a frequency modulated continuous wave (FMCW) signal, in an exemplary preferred embodiment, where the continuous wave is a sinewave and the frequency modulation is according to the sweep signal 310. The horizontal axis is in units of time in milliseconds (ms). The vertical axis is the normalized amplitude of the signal. The example plot in FIG. 4 is for illustrative purposes and has been drawn not to scale to more readily show a reduced number of individual cycles. The characteristics of the varying frequency signal 330 may vary depending upon the requirements of an embodiment of the radar apparatus 100.

Figure 5:
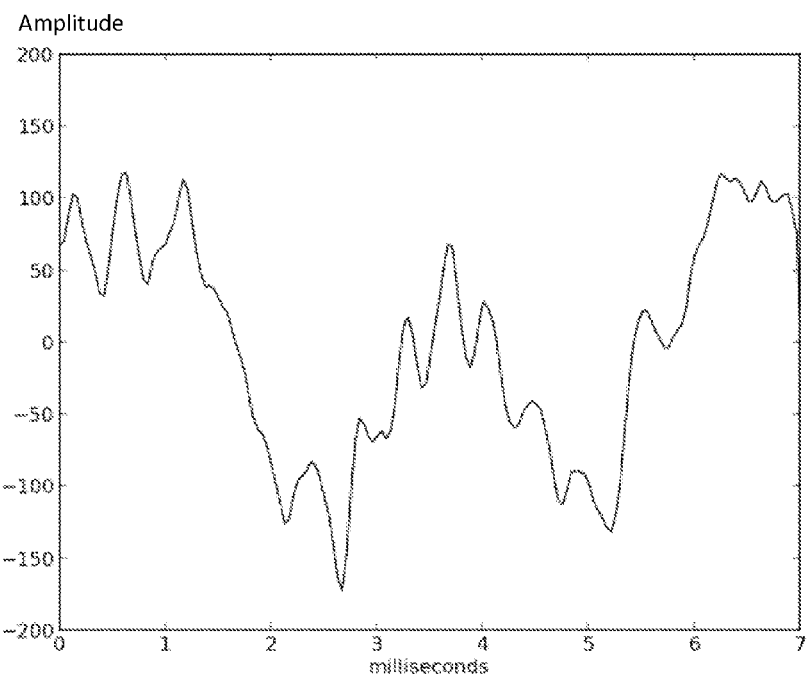
FIG. 5 illustrates a plot of a received signal according to embodiments of the present inventions.

FIG. 5 illustrates a received signal 210, of an exemplary preferred embodiment of the radar apparatus 100. The horizontal axis is in units of time in milliseconds (ms). The vertical axis is the amplitude of the received signal. The example plot in FIG. 5 is for illustrative purposes. Characteristics of the received signal 210 may vary depending upon the embodiment of the radar apparatus 100, the settings of the parameter values of the radar apparatus, the operating environment, and other factors.

Figure 6:
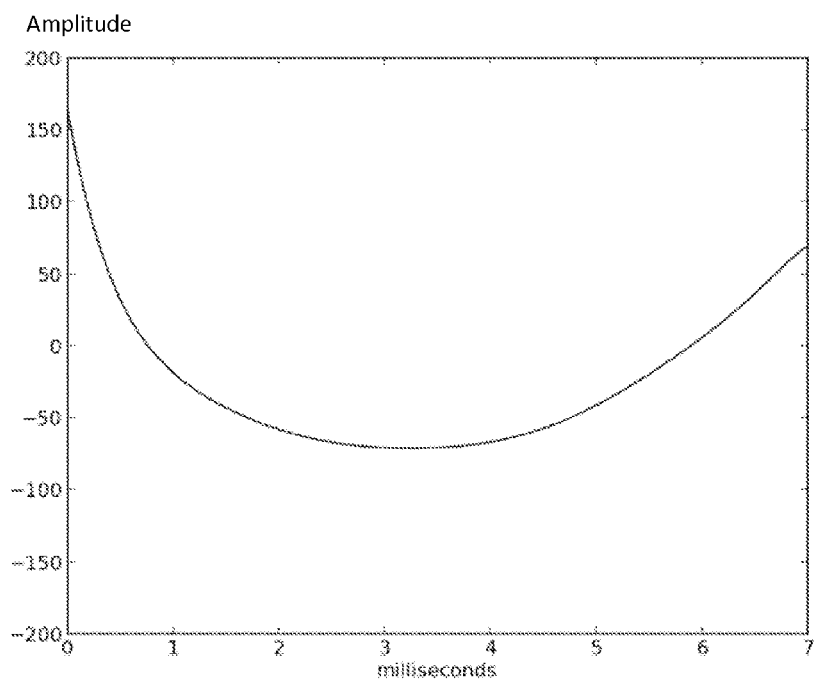
FIG. 6 illustrates a plot of a previously stored compensation signal according to embodiments of the present inventions.

FIG. 6 illustrates an exemplary previously stored compensation signal 165, of an exemplary preferred embodiment of the radar apparatus 100. The horizontal axis is in units of time in milliseconds (ms). The vertical axis is the amplitude of the previously stored compensation signal. The example plot in FIG. 6 is for illustrative purposes. The characteristics of the previously stored compensation signal 165 may vary depending upon the embodiment of the radar apparatus 100. The characteristics of the previously stored compensation signal 165 may also vary depending upon the settings of the parameter values of the radar apparatus when the previously stored compensation signal was measured and stored, and other factors.

Figure 7:
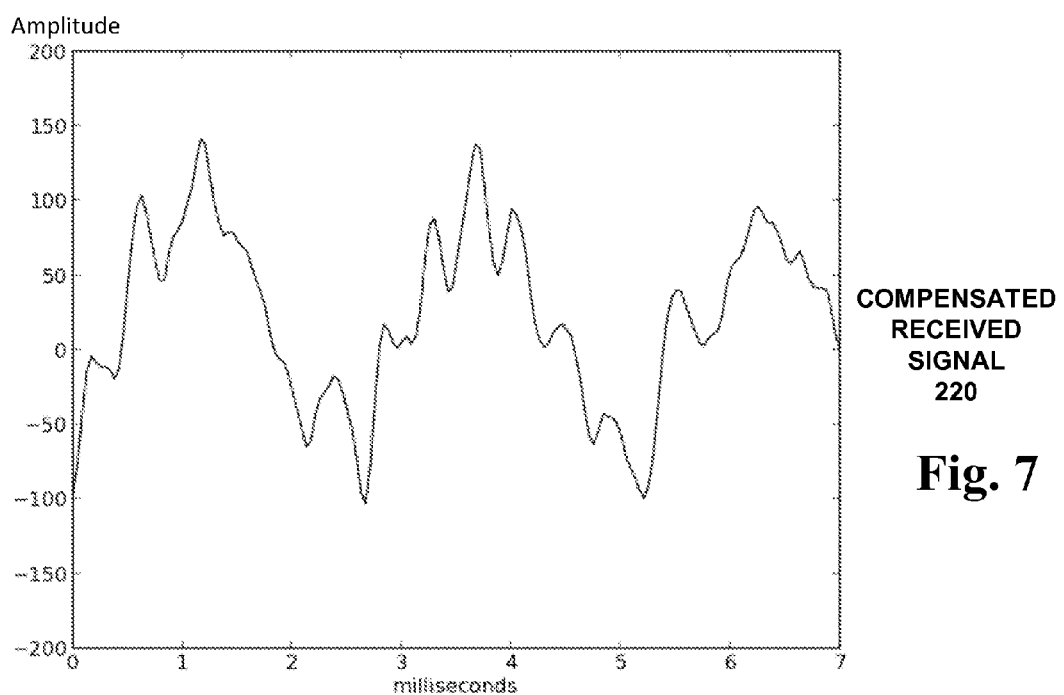
FIG. 7 illustrates a plot of a compensated received signal according to embodiments of the present inventions.

FIG. 7 illustrates a compensated received signal 220, of an exemplary preferred embodiment of the radar apparatus 100. The horizontal axis is in units of time in milliseconds (ms). The vertical axis is the amplitude of the compensated received signal. The compensated received signal illustrated in FIG. 7 is the output result of the compensation circuit 150, with the inputs of the received signal 210 as illustrated in FIG. 5 and of the previously stored compensation signal 165 as illustrated in FIG. 6. The example plot in FIG. 7 is for illustrative purposes. The characteristics of the compensated received signal 220 may vary depending upon the embodiment of the radar apparatus 100. The characteristics of the compensated received signal 220 may also vary depending upon the settings of the parameter values of the radar apparatus, the operating environment, and other factors.

Figure 8:
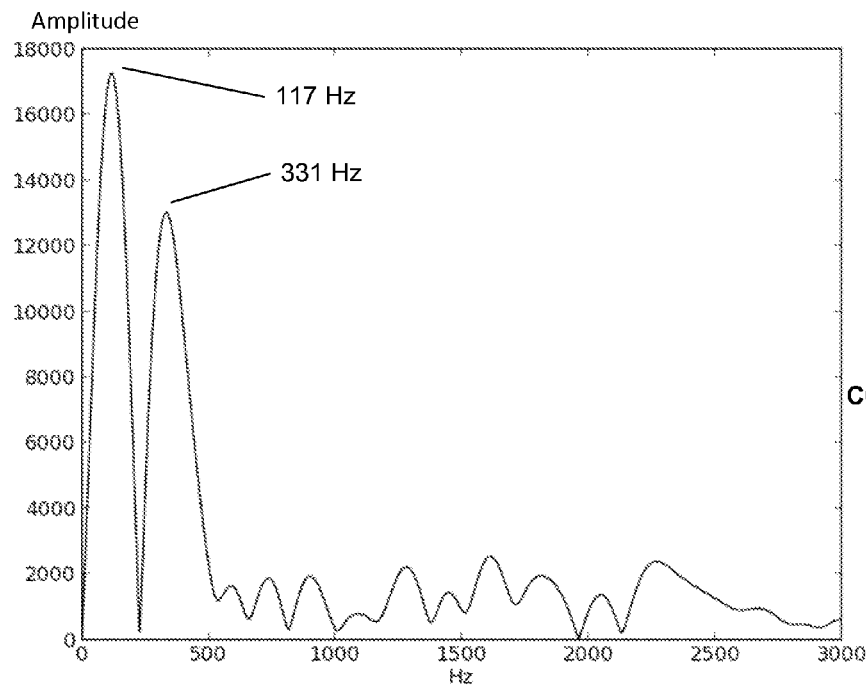
FIG. 8 illustrates a plot of a frequency spectrum signal of an exemplary preferred embodiment of the radar apparatus, when the previously stored compensation signal is essentially zero, and there is no compensation.

FIG. 8 illustrates a frequency spectrum signal of an exemplary preferred embodiment of the radar apparatus 100, when the previously stored compensation signal is essentially zero, and there is no compensation. The horizontal axis is in units of frequency in Hertz (Hz). The vertical axis is the amplitude of the frequency spectrum plot. The previously stored compensation signal may be zero if the calibration of the radar apparatus has not been conducted, if an indicator within the radar apparatus has a status of the calibration not being conducted yet, if the previously stored compensation signal has not been stored into memory yet, or if similar pre-calibration states or conditions are set within the radar apparatus. The frequency spectrum signal of the received signal of FIG. 8 is for illustrative and comparison purposes.

Figure 9:
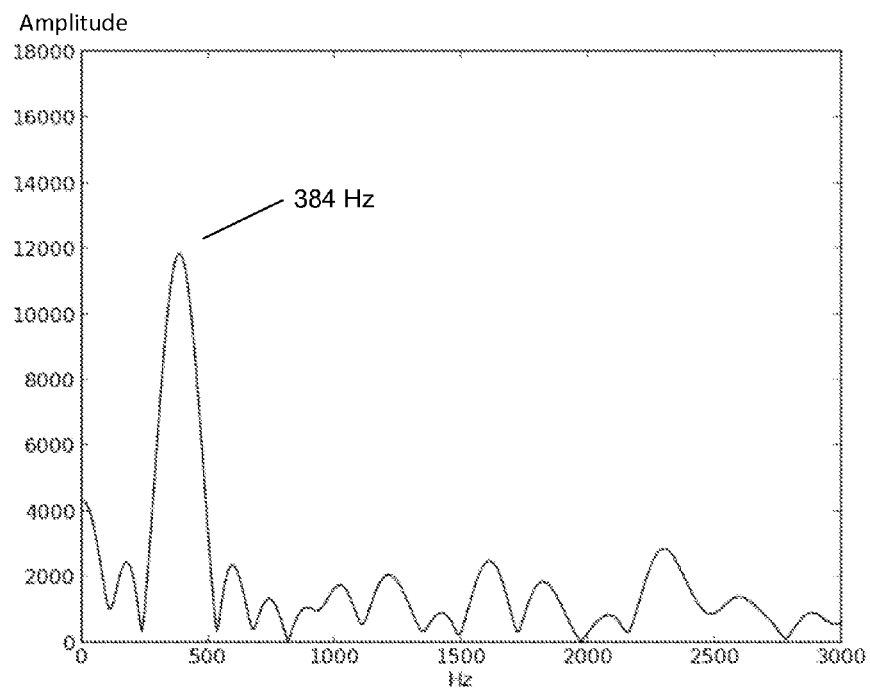
FIG. 9 illustrates a plot of a frequency spectrum signal according to embodiments of the present inventions.

FIG. 9 illustrates a frequency spectrum signal 230, of an exemplary preferred embodiment of the radar apparatus 100. The horizontal axis is in units of frequency in Hertz (Hz). The vertical axis is the amplitude of the frequency spectrum plot. The illustrated frequency spectrum signal in this FIG. 8 is the output result of the exemplary Fast Fourier transform (FFT) by the frequency transformation circuit, with the input of the compensated received signal 220 as illustrated in FIG. 7. The example plot in FIG. 9 is for illustrative purposes. The characteristics of the frequency spectrum signal 230 may vary depending upon the embodiment of the radar apparatus 100. The characteristics of the frequency spectrum signal 230 may also vary depending upon the settings of the parameter values of the radar apparatus, the operating environment, and other factors.

When comparing FIG. 8 and FIG. 9, it is evident that the peaks of the frequency spectrum signal are dramatically different, especially at frequencies below about 800 Hz. The highest peak of FIG. 8, occurring at 117 Hz, corresponds to the ramp frequency of the sweep signal 310. When the peak detector 180 analyzes the frequency spectrum signal of FIG. 8, the peak detector will falsely detect an object at a distance corresponding to the ramp frequency. When the peak detector 180 analyzes the frequency spectrum signal of FIG. 9, the peak detector will correctly detect an object at a distance corresponding to the peak frequency occurring at 384 Hz. The invention not only minimizes the effect of the ramp frequency in the compensated frequency spectrum signal, but the invention also adjusts the frequency spectrum signal to improve the accuracy of measuring characteristics of the at least one object. In the illustrated frequency spectrum signal without compensation of FIG. 8, the detected object has a corresponding peak at 331 Hz. In the illustrated compensated frequency spectrum signal of FIG. 9, the frequency peak of the detected object is adjusted to 384 Hz, which corresponds to a more accurate measurement of the object, per the corresponding conditions.

Figure 10:
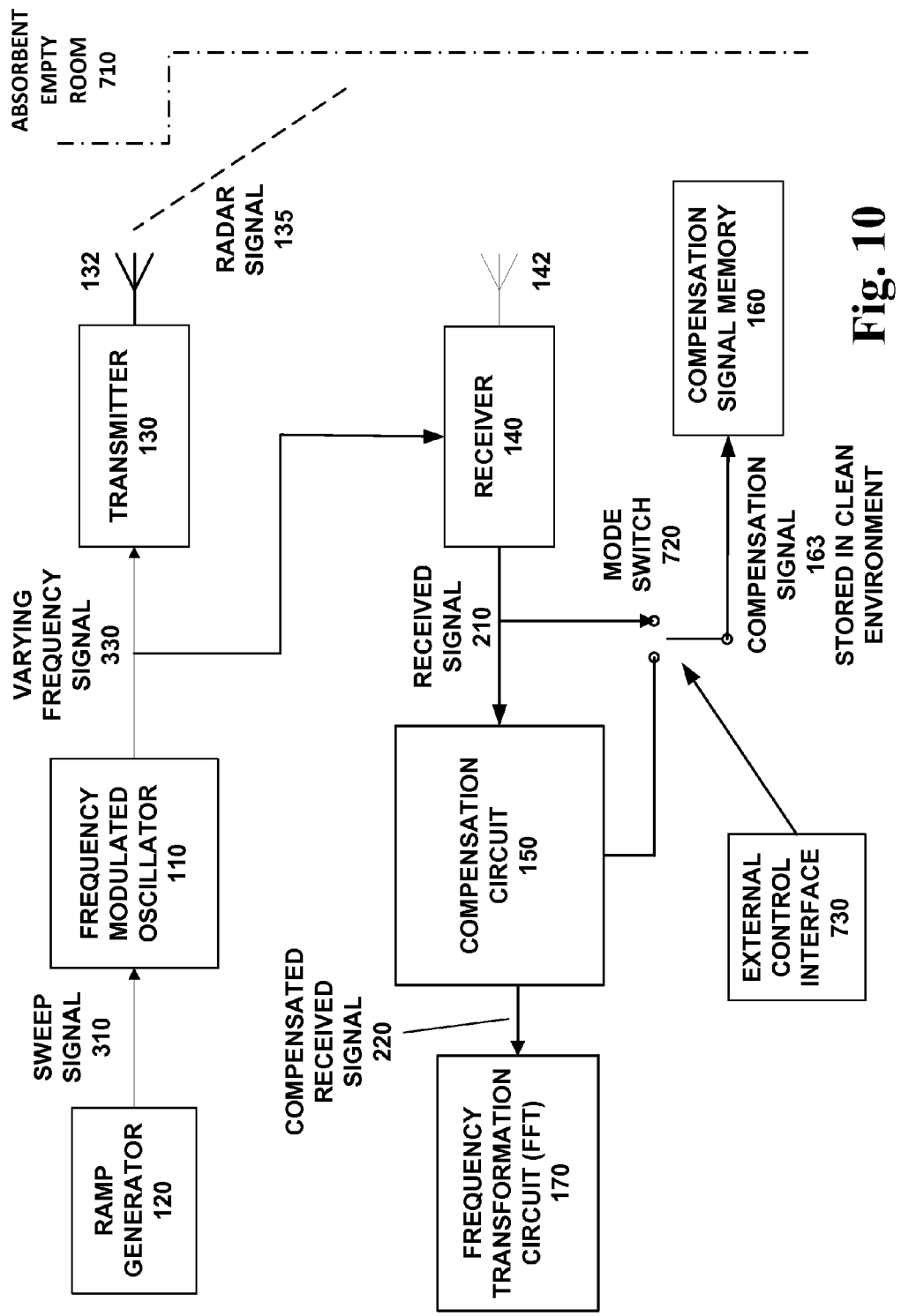
FIG. 10 illustrates a schematic block diagram of a radar apparatus according to embodiments of the present inventions, during a calibration mode.

FIG. 10 illustrates a schematic block diagram of a radar apparatus according to embodiments of the present inventions during a calibration mode. In the calibration mode, the content of the compensation signal memory 160 is initialized or written. In the embodiment, the radar apparatus 100 is placed within an absorbent empty room 710 wherein essentially the entire radar signal 135 is absorbed. Alternately this room can be an open air range. A mode switch 720 is coupled to the received signal 210 and the compensation signal memory 160. An external control interface 730 controls the mode switch to switch from the compensation circuit 150, for normal operating mode, to the compensation signal memory 160, for calibration mode. The external control interface 730 can be a button control by a user of the radar apparatus 100 or control of the radar apparatus 100 in a factory environment by a microprocessor internal or external to the radar apparatus 100. During calibration mode, the compensation signal 163 is the received signal 210, is stored to the compensation signal memory 160, and is subsequently retrieved from the memory 160 as the previously stored compensation signal during normal operating mode. The compensation circuit 150, the frequency transformation circuit 170 and the peak detector 180 are present but are not necessarily active during calibration mode. Even when not present, the purpose of the calibration is to enable their subsequent accurate use.

Figure 11:
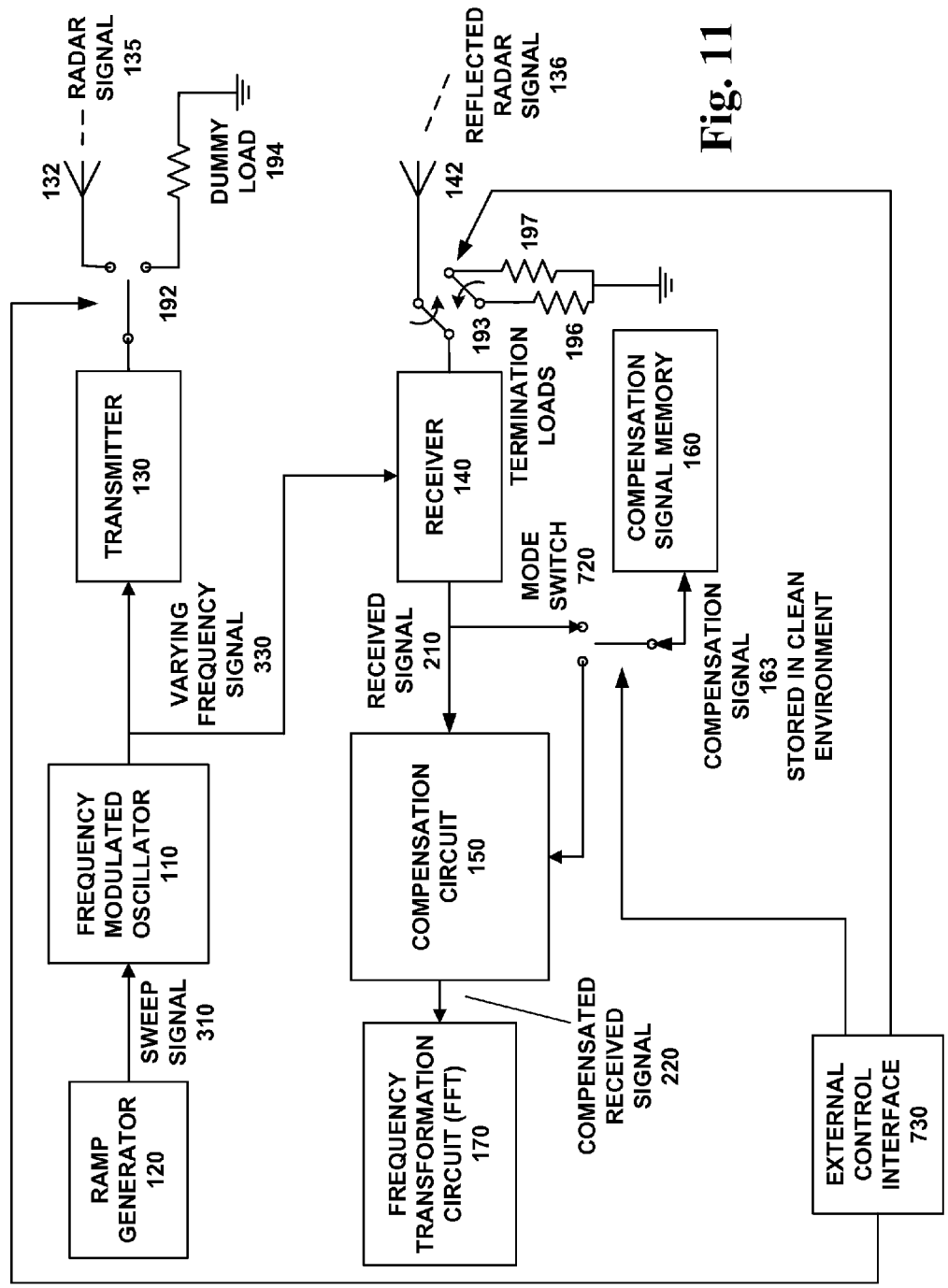
FIG. 11 illustrates a schematic block diagram of a radar apparatus according to embodiments of the present inventions during a calibration mode using a load for a quiet environment.

FIG. 11 illustrates an alternative schematic block diagram of a radar apparatus according to embodiments of the present inventions during a calibration mode using a load for a quiet environment. In the alternative embodiments of FIG. 11, the radar apparatus 100 need not necessarily be placed within an absorbent empty room. A mode switch 720 is coupled to the received signal 210 and the compensation signal memory 160. A single pole double throw load switch 192 is coupled to the transmitter 130 and a dummy load 194 to send and absorb the radar signal 135 into the dummy load 194. The receiver 140 is connected to either antenna 142 or to termination load 196 via a double pole double throw termination switch 193. The antenna 142 is connected to either receiver 140 or to termination load 197 via switch 193. An external control interface 730 controls the mode switch 720, the load switch 192, and the double pole double throw termination switch 193. The external control interface 730 can be a button control by a user of the radar apparatus 100 or control of the radar apparatus 100 in a factory environment by a microprocessor internal or external to the radar apparatus 100. For calibration mode, the external control interface controls the mode switch to switch to the compensation signal memory 160. Additionally, for calibration mode, the external control interface 730 controls when each of the load switch 192 and the double pole double throw termination switch 193 respectively couples the transmitter 130 to the dummy load 194 and the receiver 140 to the termination load 196 and antenna 142 to termination load 197. Besides an embodiment with both termination loads 196 and 197, in a first alternative embodiment, the double pole double throw termination switch 193 can be a single pole double throw switch and the termination load 197 omitted, or in a second alternative embodiment, the double pole double throw termination switch 193 can be a single pole double throw switch and the termination load 196 omitted. The coupling may be activated individually for either the load switch 192 or the double pole double throw termination switch 193. Alternatively, the coupling may be activated for both the load switch 192 and the double pole double throw termination switch 193 at the same time. During calibration mode, the received signal 210 is the compensation signal 163, is stored to the compensation signal memory 160, and is subsequently retrieved from the memory 160 as the previously stored compensation signal during normal operating mode. The compensation circuit 150, the frequency transformation circuit 170 and the peak detector 180 are present but are not necessarily active during calibration mode.

Alternatively, in calibration mode, the radar apparatus 100 may be placed within an absorbent empty room 710, as illustrated in FIG. 10; and the external control interface 730 may control at least one of the load switch and the termination switch to switch to the dummy load 194 and the termination loads 196 and 197, respectively, as illustrated in FIG. 11. The external control interface controls the mode switch to switch to the compensation signal memory 160. During calibration mode, the received signal 210 is the compensation signal 163, is stored to the compensation signal memory 160, and is subsequently retrieved from the memory 160 as the previously stored compensation signal during normal operating mode.

Figure 12:
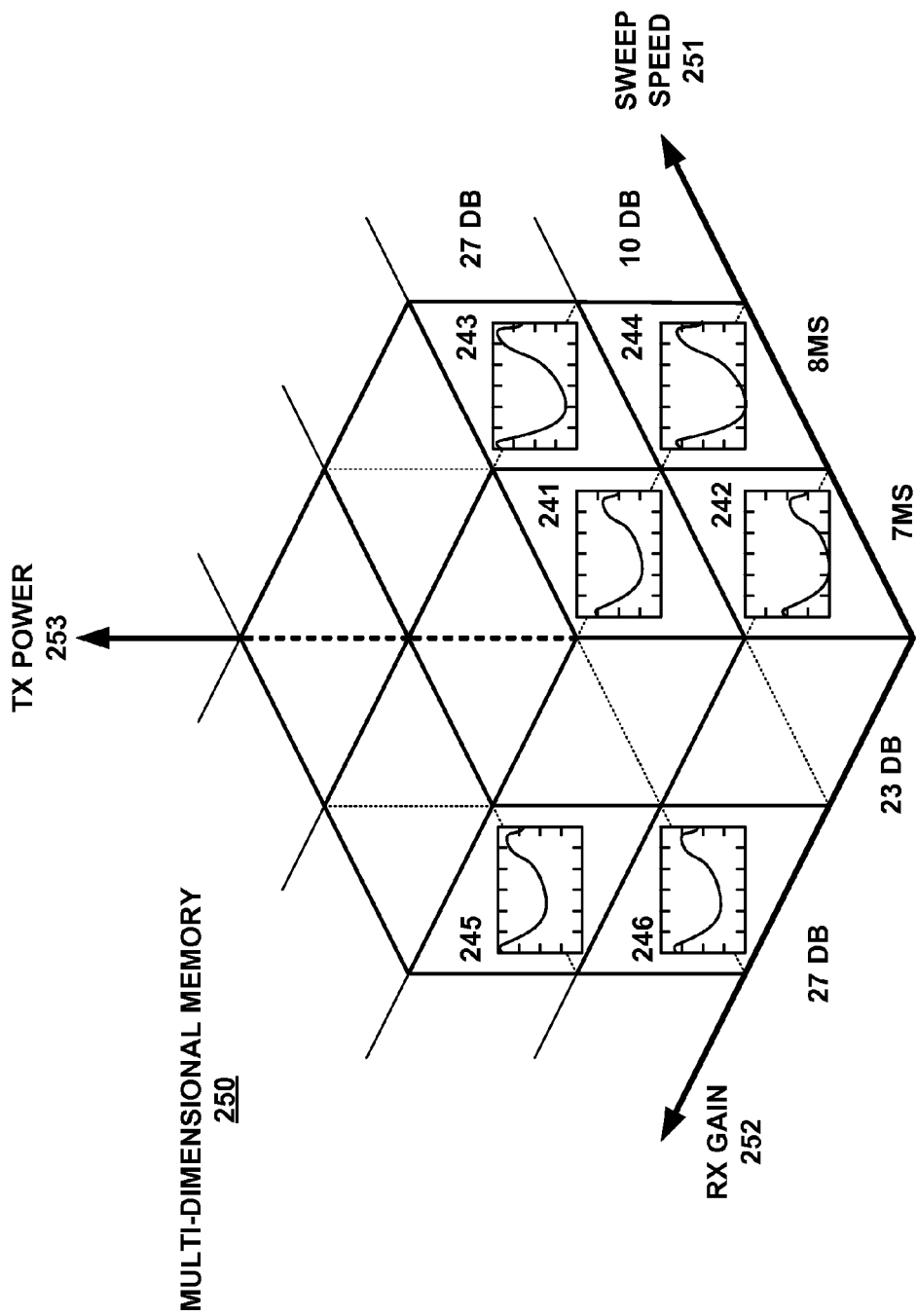
FIG. 12 illustrates a multi-dimensional memory for the compensation signal memory according to embodiments of the present inventions.

FIG. 12 illustrates a multi-dimensional memory for the compensation signal memory according to embodiments of the present inventions. FIG. 12 illustrates a multi-dimensional memory 250 for the compensation signal memory 160 storing values of transmit power, received gain, ramp time, and sweep bandwidth, among others for the previously stored compensation signal 165. In the embodiment of FIG. 12, each cell of the multi-dimensional memory 250 contains stored values of amplitude over time when exercised according to corresponding parameter settings. The X-axis (going towards the right of the page of the multi-dimensional memory 250) shows two example ramp time settings 251 of many possible values for a ramp time settings 251 of the sweep signal 310. (In the example embodiment of FIG. 1, the ramp time is the time period the sweep signal 310 goes from the lowest frequency of the varying frequency signal 330 to the highest frequency of the varying frequency signal 330.) The Y-axis (going towards the left of the page of the multi-dimensional memory 250), shows two example gain settings 252 of many possible values for receiver gain settings 252 for the receiver 140. The Z-axis (going towards the top of the page of the multi-dimensional memory 250) shows two examples of transmit power settings 253 among many possible transmit power settings 253 for the transmitter 130. In calibration mode, a quieted receiver 140 writes to each cell of the multi-dimensional memory 250 a compensation signal 165 corresponding to its combination of settings. In calibration mode, each combination of these settings is exercised to write and fill the multi-dimensional memory 250. Then, in operation mode, the calibration circuit 150 reads a previously stored compensation signal 165 from a cell of the multi-dimensional memory 250 corresponding to its combination of settings needed for operation.

Figure 13:
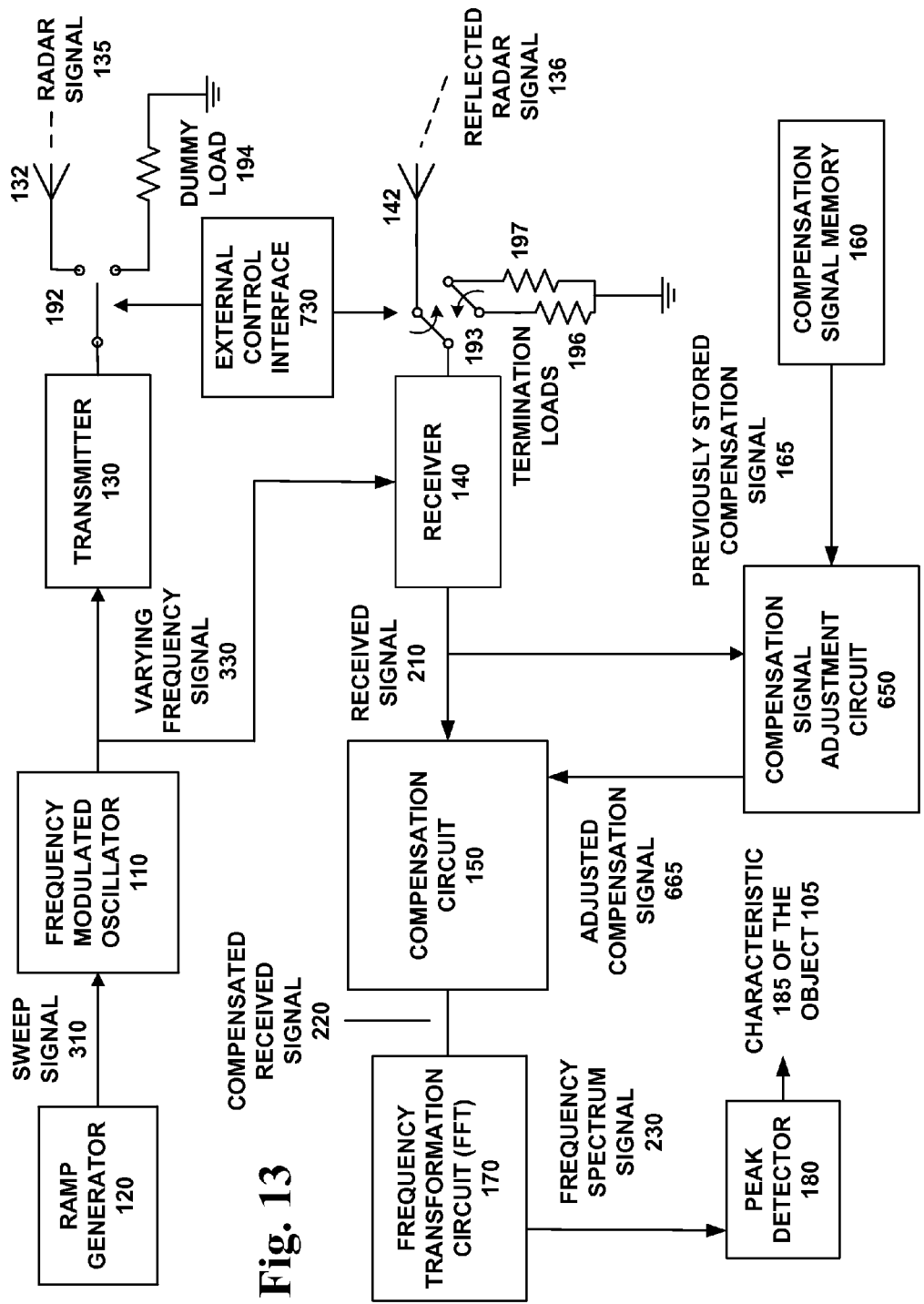
FIG. 13 illustrates a schematic block diagram of a radar apparatus according to embodiments of the present inventions during an operation mode whereby a previously stored compensation signal may be adjusted.

FIG. 13 illustrates a schematic block diagram of a radar apparatus according to embodiments of the present inventions during an operation mode whereby the previously stored compensation signal 165 may be adjusted. A load switch 192 is coupled to the transmitter 130 and a dummy load 194 to send and absorb the radar signal 135 into the dummy load 194. The compensation signal adjustment circuit 650 adjusts the previously stored compensation signal 165 based on a measurement of the received signal when the load switch 192 terminates the radar signal 135 into the dummy load 194. The adjustment to the previously stored compensation signal 165 is based on a difference between a current measurement of the received signal when the load switch 192 terminates the radar signal 135 into the dummy load and a previously stored compensation signal 165 residing within the compensation signal memory 160, which was captured in a quiet environment when all transmit signals were absorbed.

A termination switch 193 is coupled to the receiver 140 and a termination loads 196 and 197 to quiet the reflected radar signal 136. The reflected radar signal is quieted by switching the receiver from the receive antenna 142 to the termination load 196 and the receive antenna 142 to termination load 197. The compensation signal adjustment circuit 650 adjusts the previously stored compensation signal 165 based on a measurement of the received signal when the termination switch 193 is switched to the termination load 196. The adjustment to the previously stored compensation signal 165 is based on a difference between a current measurement of the received signal when the termination switch 193 quiets the reflected radar signal 136 and a previously stored compensation signal 165 residing within the compensation signal memory 160, which was captured in a quiet environment when all reflected radar signals were quieted.

The external control interface 730 can be a button control by a user of the radar apparatus 100 or control of the radar apparatus 100 in a factory environment by a microprocessor internal or external to the radar apparatus 100. The external control interface 730 controls when each of the load switch 192 and the termination switch 193 respectively couples the transmitter 130 to the dummy load 194 and the receiver 140 to the termination load 196. The coupling may be activated individually for either the load switch 192 or the termination switch 193. Alternatively, the coupling may be activated for both the load switch 192 and the termination switch 193 at the same time.

Figure 14:
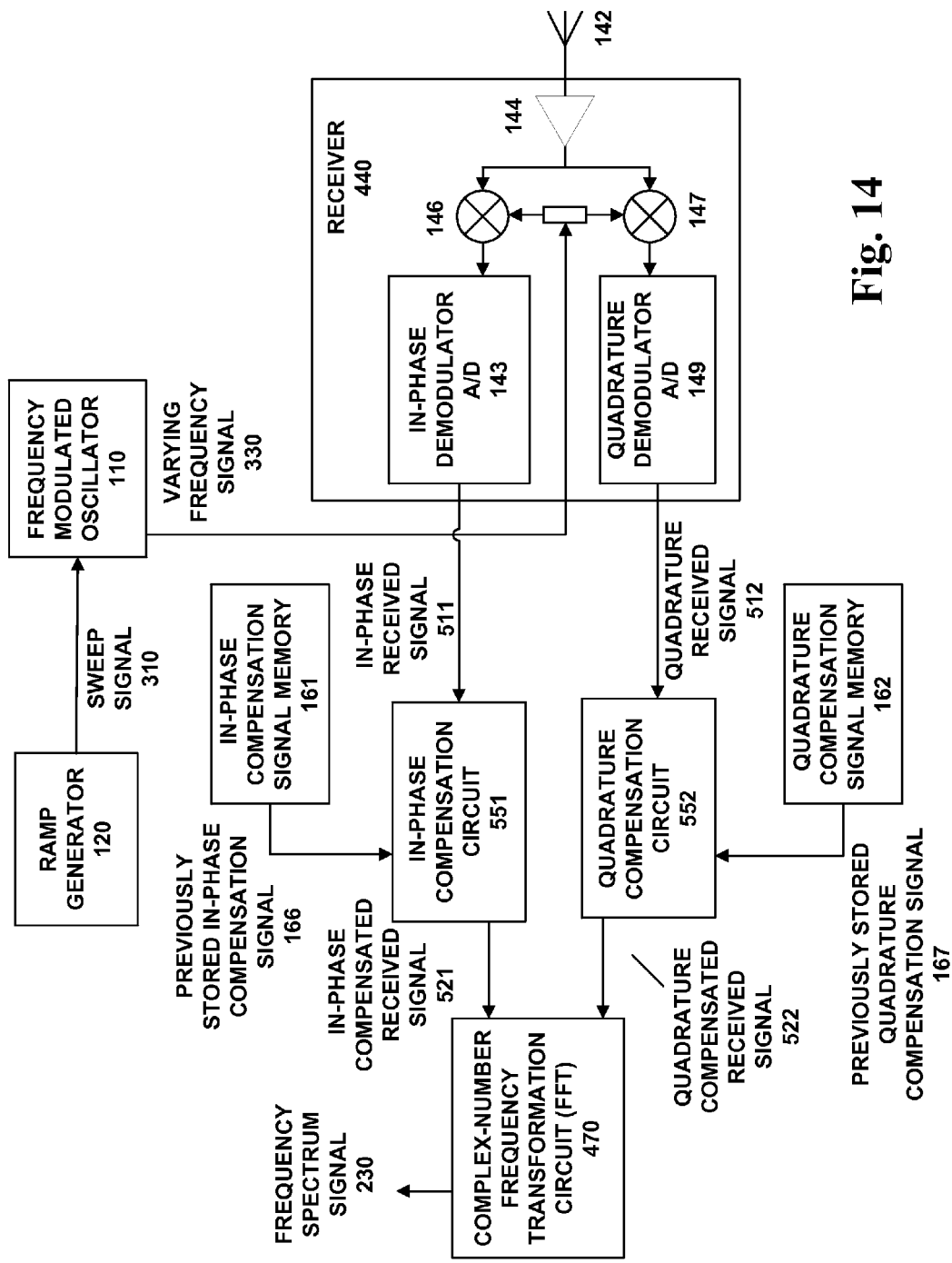
FIG. 14 illustrates a schematic block diagram of a quadrature receive path of the radar apparatus according to embodiments of the present inventions.

FIG. 14 illustrates a schematic block diagram of one exemplary preferred embodiment of a quadrature receive path of the radar apparatus 100. A receiver 440 receives a reflected radar signal 136 reflected off of an object 105 via a receive antenna 142. The receiver 440 is coupled to a receive antenna 142. The low noise amplifier (LNA) 144 is coupled to the receive antenna 142 and amplifies the reflected radar signal 136 received at the receive antenna. The receiver 440 is coupled to the frequency modulated oscillator 110. The receiver 440 uses an in-phase mixer 146 and a quadrature mixer 147 to mix the amplified reflected radar signal with the varying frequency signal 330 in the one preferred embodiment, according to that illustrated in FIG. 14. The in-phase mixer 146 is coupled to an in-phase demodulator and analog-to-digital converter (A/D) 143. The quadrature mixer 147 is coupled to a quadrature demodulator and analog-to-digital converter (A/D) 149. One output of the receiver 440 and the subsequent in-phase demodulator A/D 143 produces an in-phase received signal 511. A second output of the receiver 140 and the subsequent quadrature demodulator A/D 149 produces a quadrature received signal 512.

An in-phase compensation circuit 551 is coupled to the receiver 440, and more specifically coupled to the in-phase demodulator A/D 143, to compensate the in-phase received signal 511 based on a previously stored in-phase compensation signal 166 in a memory 161 to produce an in-phase compensated received signal 521. A quadrature compensation circuit 552 is coupled to the receiver 140, and more specifically coupled to the quadrature demodulator A/D 149, to compensate the quadrature received signal 512 based on a previously stored quadrature compensation signal 167 in a memory 162 to produce a quadrature compensated received signal 522.

The previously stored in-phase compensation signal 166 and the previously stored quadrature compensation signal 167 are previously measured in-phase received signal and previously measured quadrature received signal, respectively, in the absence of a reflected radar signal 136, measured during a calibration mode. The previously stored in-phase compensation signal 166 and the previously stored quadrature compensation signal 167 are time domain signals in the preferred embodiment. The previously stored in-phase compensation signal 166 and previously stored quadrature compensation signal 167 are measured previously and representative of at least the varying frequency signal based on the sweep signal. The previously stored in-phase compensation signal 166 and the previously stored quadrature compensation signal 167 are composed of undesired signals including leakage artifacts involving one or more of the ramp generator 120 including the sweep signal 310, the oscillator 110, the transmitter 130, the receiver 140, and signal couplings therebetween. The previously stored in-phase compensation signal 166 and the previously stored quadrature compensation signal 167 are dependent upon various parameter values of the radar apparatus including receive gain, frequency, transmit power, sampling rate, bandwidth, and ramp time. Therefore, in the preferred embodiment, multiple compensation signals are measured and stored based on multiple sets of the various parameter values while operating in calibration mode. The calibration mode is conducted in a quiet room environment or other quiet environment when all radar signals were absorbed in order to measure and determine the previously stored in-phase compensation signal 166 and the previously stored quadrature compensation signal 167. The previously stored in-phase compensation signal 166 and the previously stored quadrature compensation signal 167 comprise a lookup table with possibly multiple dimensions based on the multiple sets of the various parameter values while operating in the calibration mode. The previously stored in-phase compensation signal 166 and the previously stored quadrature compensation signal 167 may be unique to a particular hardware and its prior measured characteristics due to hardware component variations and/or other factors.

The previously stored in-phase compensation signal 166 and the previously stored quadrature compensation signal 167 respectively used by the in-phase compensation circuit 551 and the quadrature compensation circuit 552 can be chosen from a plurality of previously stored compensation signals, each of the plurality of previously stored compensation signals corresponding to various parameters including receive gain, frequency, transmit power, sampling rate, bandwidth, and ramp time.

The in-phase compensation circuit 551 preferably subtracts the previously stored in-phase compensation signal 166 from the in-phase received signal 511 to generate the in-phase compensated received signal 521. The quadrature compensation circuit 552 preferably subtracts the previously stored quadrature compensation signal 167 from the quadrature received signal 512 to generate the quadrature compensated received signal 522.

A complex-number frequency transformation circuit 470 is coupled to the in-phase compensation circuit 551 and the quadrature compensation circuit 552 to receive the in-phase compensated received signal 521 and the quadrature compensated received signal 522 and produce a frequency spectrum signal 230. In the one embodiment of FIG. 14, a Fast Fourier Transform (FFT) is performed on complex compensated received signals from the complex-number frequency transformation circuit 470. These complex compensated received signals are the in-phase compensated received signal 521 and the quadrature compensated received signal 522. The complex-number frequency transformation circuit 470 transforms the compensated received signal into the frequency domain to produce frequency spectrum signal 230 which is representative of the compensated received signal. The frequency spectrum signal 230 is illustrated in FIG. 9.

A peak detector 180 and offset correction circuit 186 may further process and analyze the frequency spectrum signal 230, as illustrated in FIG. 1 and as previously described.

Two amplifiers, which may be coupled between respective of the in-phase compensation circuit 551 and the complex-number frequency transformation circuit 470 and coupled between the quadrature compensation circuit 552 and the complex-number frequency transformation circuit 470, may further amplify the in-phase compensated received signal 521 and the quadrature compensated received signal 522 to improve signal to noise ratio and consequently peak detection by a peak detector 180, as illustrated in FIG. 2 and as previously described.

Figure 15:
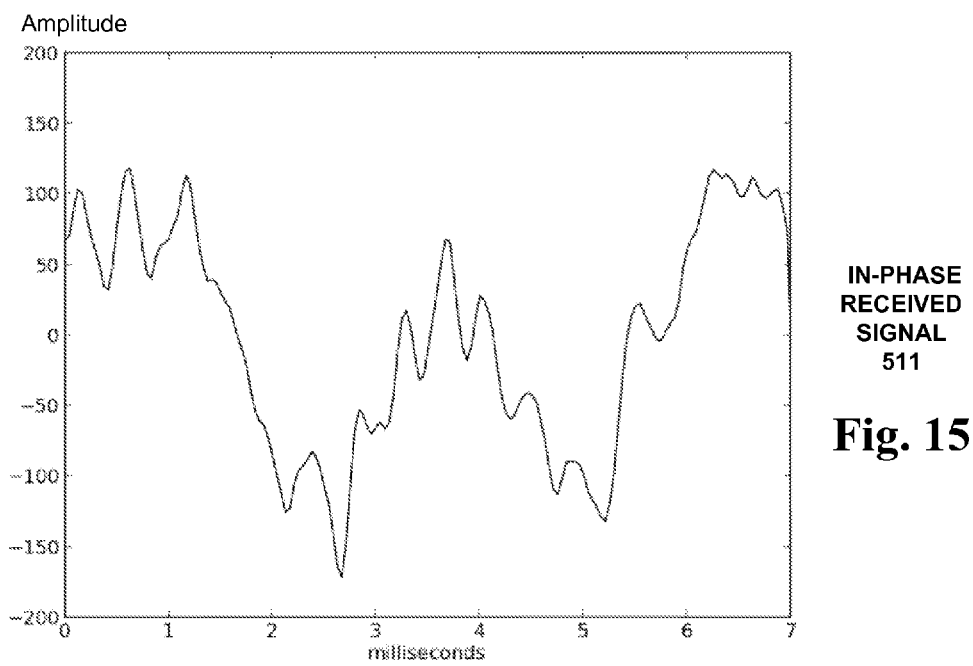
FIG. 15 illustrates a plot of an in-phase received signal according to embodiments of the present inventions.

FIG. 15 illustrates an in-phase received signal 511, of an exemplary preferred embodiment of the radar apparatus 100. The horizontal axis is in units of time in milliseconds (ms). The vertical axis is the amplitude of the received signal. The example plot in FIG. 15 is for illustrative purposes. The characteristics of the in-phase received signal 511 may vary depending upon the embodiment of the radar apparatus 100. The characteristics of the in-phase received signal 511 may also vary depending upon the settings of the parameter values of the radar apparatus, the operating environment, and other factors.

Figure 16:
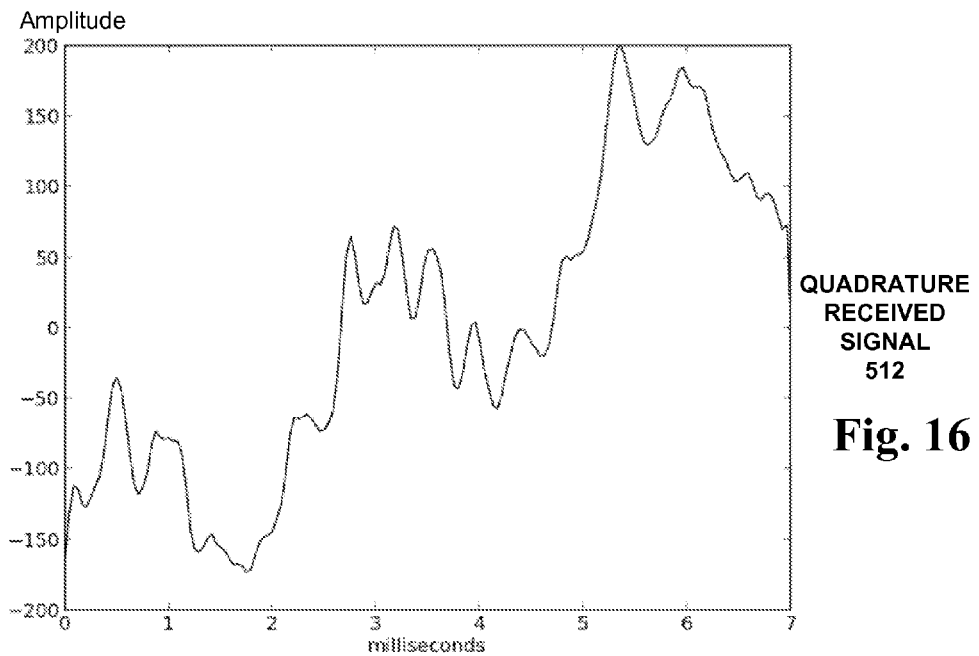
FIG. 16 illustrates a plot of a quadrature received signal according to embodiments of the present inventions.

FIG. 16 illustrates a quadrature received signal 512, of an exemplary preferred embodiment of the radar apparatus 100. The horizontal axis is in units of time in milliseconds (ms). The vertical axis is the amplitude of the received signal. The example plot in FIG. 16 is for illustrative purposes. The characteristics of the quadrature received signal 512 may vary depending upon the embodiment of the radar apparatus 100. The characteristics of the quadrature received signal 512 may also vary depending upon the settings of the parameter values of the radar apparatus, the operating environment, and other factors.

Figure 17:
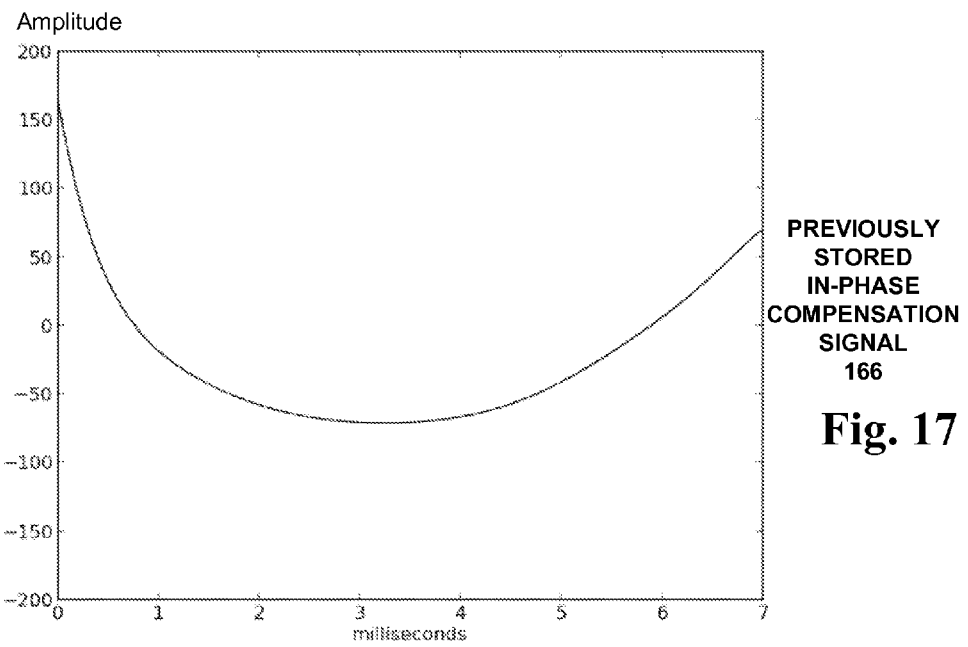
FIG. 17 illustrates a plot of a previously stored in-phase compensation signal according to embodiments of the present inventions.

FIG. 17 illustrates a previously stored in-phase compensation signal 166, of an exemplary preferred embodiment of the radar apparatus 100. The horizontal axis is in units of time in milliseconds (ms). The vertical axis is the amplitude of the previously stored in-phase compensation signal. The example plot in FIG. 17 is for illustrative purposes. The characteristics of the previously stored in-phase compensation signal 166 may vary depending upon the embodiment of the radar apparatus 100. The characteristics of the previously stored in-phase compensation signal 166 may also vary depending upon the settings of the parameter values of the radar apparatus when the previously stored compensation signal was measured and stored, and other factors.

Figure 18:
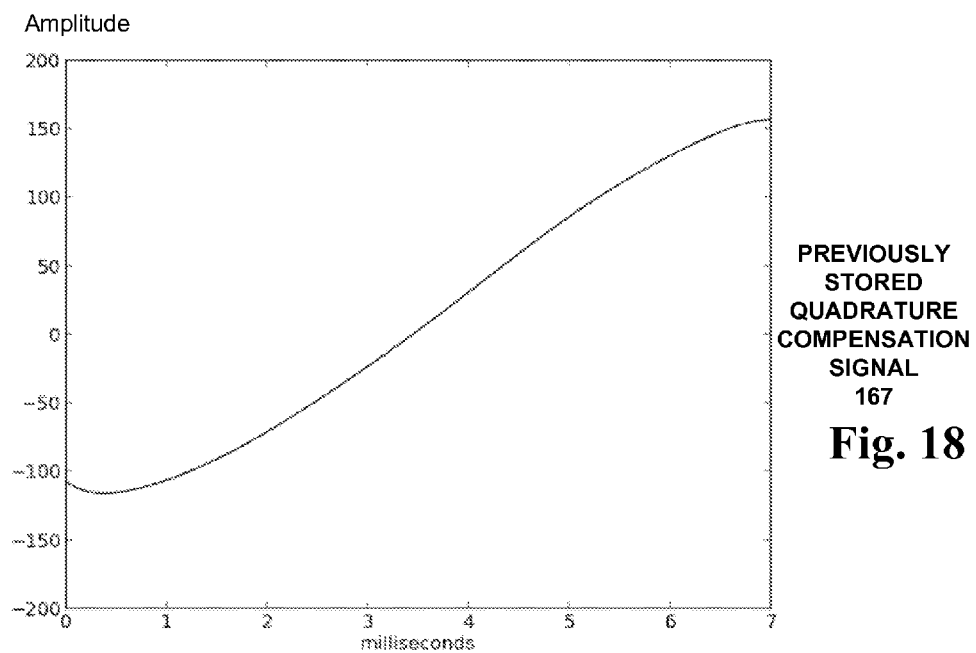
FIG. 18 illustrates a plot of a previously stored quadrature compensation signal according to embodiments of the present inventions.

FIG. 18 illustrates a previously stored quadrature compensation signal 167, of an exemplary preferred embodiment of the radar apparatus 100. The horizontal axis is in units of time in milliseconds (ms). The vertical axis is the amplitude of the previously stored quadrature compensation signal. The example plot in FIG. 18 is for illustrative purposes. The characteristics of the previously stored quadrature compensation signal 167 may vary depending upon the embodiment of the radar apparatus 100. The characteristics of the previously stored quadrature compensation signal 167 may also vary depending upon the settings of the parameter values of the radar apparatus when the previously stored compensation signal was measured and stored, and other factors.

Figure 19:
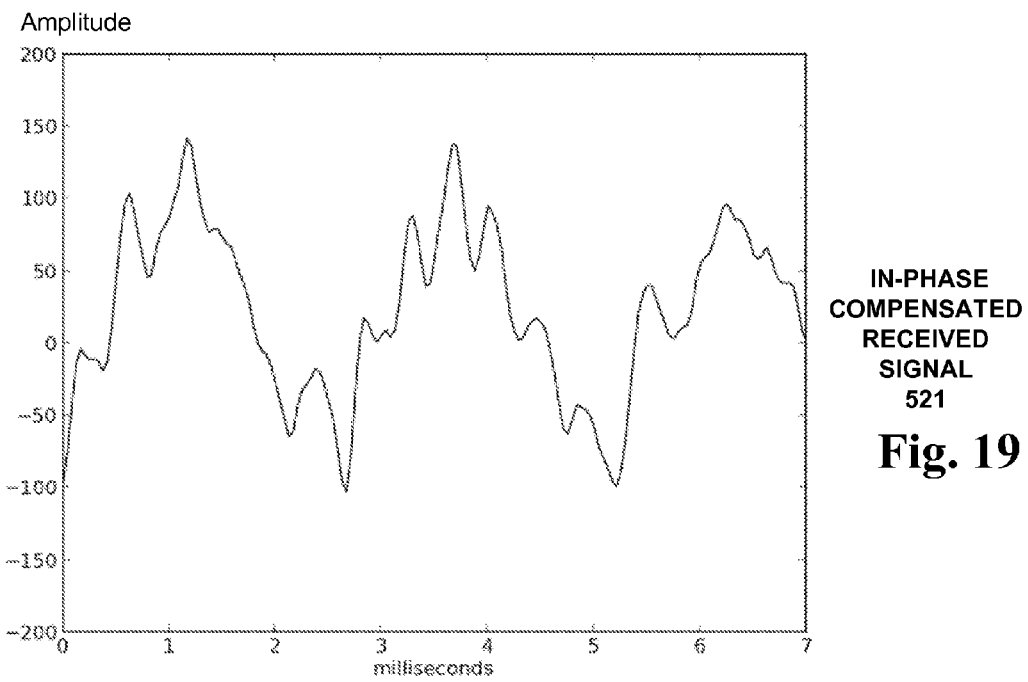
FIG. 19 illustrates a plot of an in-phase compensated received signal according to embodiments of the present inventions.

FIG. 19 illustrates an in-phase compensated received signal 521, of an exemplary preferred embodiment of the radar apparatus 100. The horizontal axis is in units of time in milliseconds (ms). The vertical axis is the amplitude of the in-phase compensated received signal. The illustrated in-phase compensated received signal in this FIG. 19 is the output result of the in-phase compensation circuit 551, with the inputs of the in-phase received signal 511 and of the previously stored in-phase compensation signal 166, as illustrated in FIG. 14. The example plot in FIG. 19 is for illustrative purposes. The characteristics of the in-phase compensated received signal 521 may vary depending upon the embodiment of the radar apparatus 100. The characteristics of the in-phase compensated received signal 521 may also vary depending upon the settings of the parameter values of the radar apparatus, the operating environment, and other factors.

Figure 20:
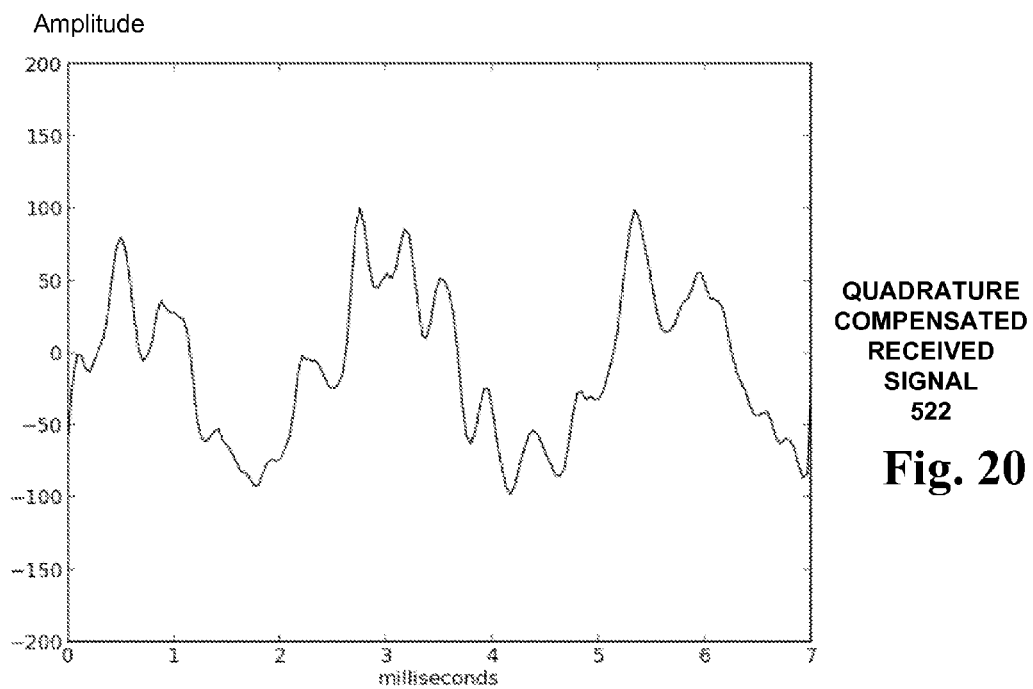
FIG. 20 illustrates a plot of a quadrature compensated received signal according to embodiments of the present inventions.

FIG. 20 illustrates a quadrature compensated received signal 522, of an exemplary preferred embodiment of the radar apparatus 100. The horizontal axis is in units of time in milliseconds (ms). The vertical axis is the amplitude of the quadrature compensated received signal. The illustrated quadrature compensated received signal in this FIG. 20 is the output result of the quadrature compensation circuit 552, with the inputs of the quadrature received signal 512 and of the previously stored quadrature compensation signal 167, as illustrated in FIG. 14. The example plot in FIG. 20 is for illustrative purposes. The characteristics of the quadrature compensated received signal 522 may vary depending upon the embodiment of the radar apparatus 100. The characteristics of the quadrature compensated received signal 522 may also vary depending upon the settings of the parameter values of the radar apparatus, the operating environment, and other factors.

Figure 21:
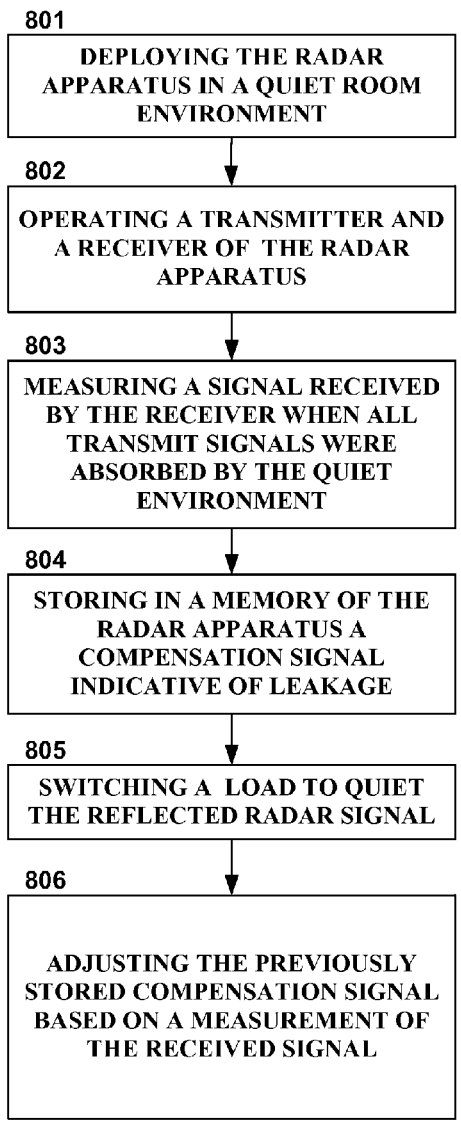
FIG. 21 illustrates a flowchart of the calibration and calibration adjustments for an exemplary radar apparatus according to embodiments of the present inventions.

FIG. 21 illustrates a flowchart of the calibration and calibration adjustments for an exemplary radar apparatus according to embodiments of the present inventions. The calibration flow begins at step 801 of deploying the radar apparatus in a quiet room environment. In step 802 the transmitter and receiver of the radar apparatus are then activated and the transmitter emits the radar signal. The quiet room environment absorbs essentially the entirety of the emitted radar signal. Alternatively to a quiet room environment, as illustrated in FIG. 11, the radar signal may be sent to a dummy load at the transmitter and/or the receiver may be terminated by a termination load, to quiet essentially the entirety of the radar signal. In step 803 the receiver measures the received signal during this condition when essentially the entirety of the transmit signals are absorbed by the quiet environment. By the quiet environment, the transmit signals are sent to a dummy load, and/or the receiver is terminated by a termination load 803. In step 804 the measured received signal is stored into a memory of the radar apparatus as a compensation signal indicative of undesired signals including leakage artifacts. The initial calibration process ends with said step 804 of storing of the compensation signal into memory.

During operational mode, calibration adjustments are made in steps 805 and 806. In step 805 the radar apparatus may be switched to a mode in which the transmit signals are sent to a dummy load and/or the receiver is terminated by a termination load whereby quieting essentially the entirety of the reflected radar signal. While in this quiet mode, the previously stored compensation signal may be adjusted in step 806 based on a measurement of the received radar signal. This adjusted compensation signal may then be used to compensate future received signals during normal operational mode.

Figure 22:
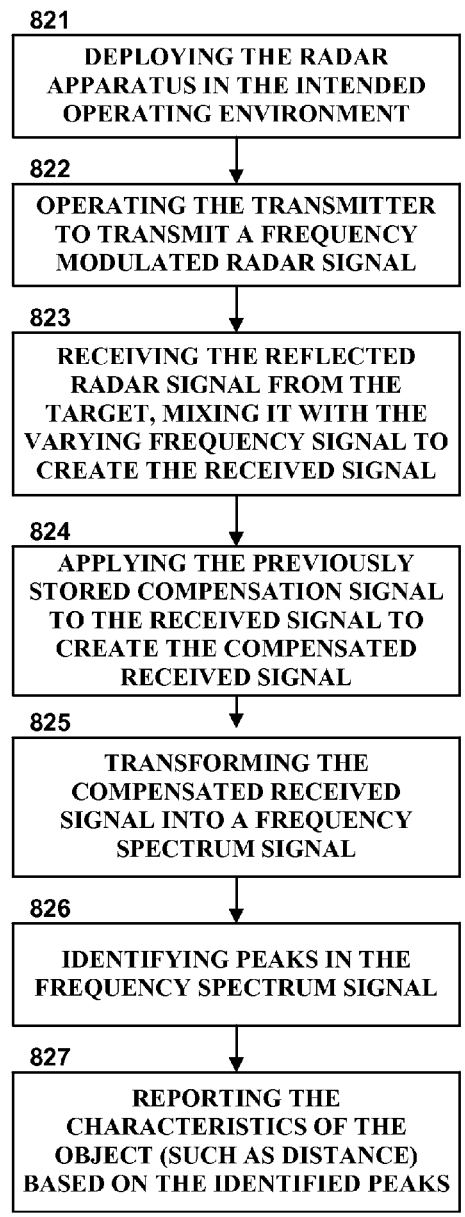
FIG. 22 illustrates a flowchart of the operation for an exemplary radar apparatus according to embodiments of the present inventions.

FIG. 22 illustrates a flowchart of the operation for an exemplary radar apparatus according to embodiments of the present inventions. The operation flow begins in step 821 with the radar apparatus deployed in an intended operating environment. In step 822 the transmitter is then activated to transmit a frequency modulated radar signal. The receiver receives the reflected radar signal which is reflected off of at least one object in step 823 and mixes the reflected radar signal with the varying frequency signal to generate the received signal. Step 824 applies the previously stored compensation signal to the received signal to create the compensated received signal. Step 825 transforms the compensated received signal into a frequency spectrum signal. In one preferred embodiment, a Fast Fourier Transform (FFT) performs the frequency transformation. Step 826 identifies one or more peaks in the frequency spectrum signal. Step 827 reports the characteristics of the at least one object based on the identified peaks in the frequency spectrum signal. The reported characteristics may include presence, distance, speed, acceleration, direction of motion, size, and reflectivity alone or in combination.

The radar apparatus of the present inventions is useful for measuring in various applications, including security and safety systems, train crossings, cross roads, power tools, intruder alert, high-end lighting. It is also useful for medical application use—heart beat and/or breathing detection. It is additionally useful to detect and resolve multiple stationary objects. It is also additionally useful for thru-wall object detection or to detect different sizes of objects within a wall or automotive applications.

The signal processing techniques disclosed herein with reference to the accompanying drawings are preferably implemented on one or more digital signal processors (DSPs) or other microprocessors. Nevertheless, such techniques could instead be implemented wholly or partially as discrete components or hardwired circuits. Further, it is appreciated by those of skill in the art that certain well known digital processing techniques are mathematically equivalent to one another and can be represented in different ways depending on choice of implementation.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A radar apparatus for measuring at least one characteristic of at least one object, comprising
    a sweep generator for generating a sweep signal;
    an oscillator coupled to the sweep generator and modulated by the sweep signal to generate a varying frequency signal;
    a transmitter operatively coupled to the oscillator to amplify the varying frequency signal and generate a radar signal;
    a receiver operatively coupled to the oscillator to receive a reflected radar signal reflected off of the at least one object and receive the reflected radar signal to produce a received signal using the varying frequency signal;
    a compensation signal memory for holding a previously stored compensation signal;
    a compensation circuit operatively coupled to the receiver and the compensation signal memory to compensate the received signal based on the previously stored compensation signal to produce a compensated received signal;
a frequency transformation circuit operatively coupled to the compensation circuit to transform the compensated received signal into a frequency domain to produce a frequency spectrum signal of the compensated received signal; and
a peak detector operatively coupled to the frequency transformation circuit to measure the characteristic of the object which the reflected radar signal was reflected based on a peak of the frequency spectrum signal.

2. A radar apparatus according to claim 1, wherein the previously stored compensation signal is essentially composed of undesired signals including leakage artifacts involving one or more of the sweep generator including the sweep signal, the oscillator, the transmitter, the receiver, and signal couplings therebetween.

3. A radar apparatus according to claim 1, wherein the radar apparatus measures a characteristic of the at least one object when a frequency difference between the radar signal and the reflected radar signal is near a frequency of the sweep signal.

4. A radar apparatus according to claim 1, wherein the previously stored compensation signal written to the compensation signal memory of a particular radar apparatus was individually calibrated and stored unique to that hardware of that one radar apparatus of the compensation signal memory.

5. A radar apparatus according to claim 1, wherein, when operating in a calibration mode, the compensation signal memory is operatively coupled to the receiver to write the received signal into the compensation signal memory as the previously stored compensation signal.

6. A radar apparatus according to claim 5, wherein the calibration mode is selectively activated when the at least one object has characteristics sufficient to absorb essentially an entirety of the radar signal emitted from the transmitter.

7. A radar apparatus according to claim 5,
wherein the radar apparatus further comprises
an external control interface;
a mode switch operatively couples the received signal between the receiver and the compensation signal memory; and
wherein an input from the external control interface defines when the radar apparatus is in the calibration mode.

8. A radar apparatus according to claim 1,
wherein the received signal produced by the receiver comprises an in-phase received signal and a quadrature phase received signal;
wherein the compensation signal memory comprises
an in-phase compensation signal memory for holding a previously stored in-phase compensation signal; and
a quadrature compensation signal memory for holding a previously stored quadrature compensation signal;
wherein the compensation circuit comprises
an in-phase compensation circuit coupled to the receiver and the in-phase compensation signal memory to compensate the in-phase received signal based on the previously stored in-phase compensation signal to produce an in-phase compensated received signal; and
a quadrature compensation circuit coupled to the receiver and the quadrature compensation signal memory to compensate the quadrature received signal based on the previously stored quadrature compensation signal to produce a quadrature compensated received signal; and
wherein the frequency transformation circuit is operatively coupled to both of the in-phase compensation circuit and the quadrature compensation circuit to transform at least one of the in-phase compensated received signal and the quadrature compensated received signal into a frequency domain to produce a frequency spectrum signal;
wherein, when operating in a calibration mode, the in-phase compensation signal memory is operatively coupled to the receiver to write the in-phase received signal into the in-phase compensation signal memory as the previously stored in-phase quadrature compensation signal; and
wherein, when operating in a calibration mode, the quadrature compensation signal memory is operatively coupled to the receiver to write the quadrature received signal into the quadrature compensation signal memory as the previously stored quadrature compensation signal.

9. A radar apparatus according to claim 1, wherein the characteristic of the object from which the reflected radar signal was reflected comprises at least a near field distance.

10. A radar apparatus according to claim 1,
wherein the oscillator generates the varying frequency signal over time;
wherein the sweep signal has a predetermined pattern;
wherein the radar apparatus is a Frequency Modulated Continuous Wave (FMCW) radar apparatus and wherein the sweep signal comprises a ramp.

11. A method of measuring at least one characteristic of at least one object using radar, comprising the steps of:
(a) generating a sweep signal;
(b) generating a varying frequency signal by modulating an oscillator by the sweep signal;
(c) transmitting a radar signal based on the varying frequency signal;
(d) receiving a reflected radar signal reflected off of the at least one object;
(e) producing a received signal using the reflected radar signal received in said step (d) and the varying frequency signal generated in said step (b);
(f) holding a previously stored compensation signal;
(g) compensating the received signal produced in said step (e) using the previously stored compensation signal held in said step (f) to produce a compensated received signal;
(h) frequency transforming the compensated received signal into a frequency domain to produce a frequency spectrum signal representative of the compensated received signal; and
(i) peak detecting the frequency spectrum signal to measure a characteristic of the at least one object.

12. A method according to claim 11, wherein the previously stored compensation signal held in said step (f) is essentially composed of undesired signals including leakage artifacts involving one or more of said step (a) of generating the sweep signal, said step (b) of generating the varying frequency signal, said step (c) of transmitting the radar signal, and said step (d) of receiving the reflected radar signal.

13. A method according to claim 11, wherein said step (i) of peak detecting measures a characteristic of the at least one object when a frequency difference between the radar signal transmitted in said step (c) and the reflected radar signal received in said step (d) is near a frequency of the sweep signal generated in said step (a).

14. A method according to claim 11, wherein said step (f) of holding the previously stored compensation signal holds the previously stored compensation signal for a particular radar apparatus which was individually calibrated and stored unique to that hardware of that one particular radar apparatus.

15. A method according to claim 11, wherein, when operating in a calibration mode, said step (f) of holding a previously stored compensation signal comprises the substep of (f)(1) writing the received signal into the compensation signal memory as the previously stored compensation signal.

16. A method according to claim 15, further comprising the step of (j) selectively activating the calibration mode when the at least one object has characteristics sufficient to absorb essentially an entirety of the radar signal emitted from the transmitter.

17. A method according to claim 15, further comprising the step of (j) selectively activating the calibration mode when reflectivity of the at least one object has essentially been removed.

18. A method according to claim 11,
wherein said step (e) of producing the received signal comprises the substeps of
 (e)(1) producing an in-phase received signal using the varying frequency signal generated in said step (b); and
 (e)(2) producing a quadrature phase received signal using the varying frequency signal generated in said step (b);
wherein said step (f) of holding the previously stored compensation signal comprises the substeps of
 (f)(1) holding a previously stored in-phase compensation signal; and
 (f)(2) holding a previously stored quadrature compensation signal;
wherein said step (g) of compensating comprises the substeps of
 (g)(1) compensating the in-phase received signal based on the previously stored in-phase compensation signal to produce an in-phase compensated received signal; and
 (g)(2) compensating the quadrature received signal based on the previously stored quadrature compensation signal to produce a quadrature compensated received signal; and
wherein said step (h) of frequency transforming comprises the substep of
 (h)(1) transforming at least one of the in-phase compensated received signal and the quadrature compensated received signal into a frequency domain to produce a frequency spectrum signal.

19. A method of calibrating a radar apparatus, comprising the steps of:
 (a) deploying the radar apparatus comprising:
  a sweep generator for generating a sweep signal;
  an oscillator coupled to the sweep generator and modulated by the sweep signal to generate a varying frequency signal;
  a transmitter operatively coupled to the oscillator to amplify the varying frequency signal and generate a radar signal;
  a receiver operatively coupled to the oscillator to receive a reflected radar signal reflected off of the at least one object and receive the reflected radar signal to produce a received signal using the varying frequency signal;
  a compensation signal memory for holding a previously stored compensation signal;
  a compensation circuit operatively coupled to the receiver and the compensation signal memory to compensate the received signal based on the previously stored compensation signal to produce a compensated received signal;
  a frequency transformation circuit operatively coupled to the compensation circuit to transform the compensated received signal into a frequency domain to produce a frequency plot of the compensated received signal; and
  a peak detector operatively coupled to the frequency transformation circuit to determine a characteristic of the object which the reflected radar signal was reflected based on a peak of the frequency plot; and
 (b) operating a transmitter and a receiver of the radar apparatus;
 (c) configuring the radar apparatus such that the receiver obtains substantially no reflection from the transmitter; and
 (d) storing in a compensation signal memory of the radar apparatus essentially an entirety of the received signal as a compensation signal.

* * * * *